US012526691B2

(12) United States Patent
Kim

(10) Patent No.: US 12,526,691 B2
(45) Date of Patent: Jan. 13, 2026

(54) METHOD AND APPARATUS FOR EFFECTIVELY PERFORMING HEADER COMPRESSION OR DECOMPRESSION PROCEDURE IN NEXT-GENERATION MOBILE COMMUNICATION SYSTEM

(71) Applicant: SAMSUNG ELECTRONICS CO., LTD., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 18/145,775

(22) Filed: Dec. 22, 2022

(65) Prior Publication Data

US 2023/0209400 A1    Jun. 29, 2023

(30) Foreign Application Priority Data

Dec. 23, 2021    (KR) .................. 10-2021-0186155

(51) Int. Cl.
*H04W 28/06*    (2009.01)
*H04L 1/00*    (2006.01)

(52) U.S. Cl.
CPC ........... *H04W 28/06* (2013.01); *H04L 1/0006* (2013.01)

(58) Field of Classification Search
None
See application file for complete search history.

(56) References Cited

U.S. PATENT DOCUMENTS

| 9,131,003 | B2 * | 9/2015 | Chun | .................. H04W 28/06 |
|10,034,186 | B2 * | 7/2018 | Lee  | .................. H04W 76/10 |
|11,005,604 | B2 * | 5/2021 | Pan  | .................. H04W 76/15 |
|11,012,888 | B2 * | 5/2021 | Yi   | ................... H04L 67/04 |
|11,246,058 | B2 * | 2/2022 | Uchino | ................. H04L 69/22 |
|11,284,298 | B2 * | 3/2022 | Joseph | ................. H04L 69/04 |
|11,310,352 | B2 * | 4/2022 | Isomäki | ................ H04L 69/22 |
|11,330,499 | B2 * | 5/2022 | Chun | .................. H04W 48/14 |
|11,563,829 | B2 * | 1/2023 | Johansson | .......... H04L 12/4645 |

(Continued)

FOREIGN PATENT DOCUMENTS

| EP | 4047982 B1 * | 12/2024 | .......... H04B 7/2612 |
| KR | 10-2020-0049444 A | 5/2020 | |
| WO | 2021091181 A1 | 5/2021 | |

OTHER PUBLICATIONS

International Search Report and Written Opinion of the International Searching Authority dated Mar. 24, 2023, in connection with International Application No. PCT/KR2022/021090, 7 pages.

(Continued)

Primary Examiner — Melvin H Pollack

(57) ABSTRACT

The disclosure relates to a communication technique and system for combining an IoT technology with a 5G communication system for supporting a higher data rate than a 4G system. The disclosure is applicable to intelligent services (e.g., smart home, smart building, smart city, smart car or connected car, healthcare, digital education, retail business, security and safety-related service, and the like) on the basis of a 5G communication technology and an IoT-related technology. The disclosure provides a method and apparatus for effectively performing a header compression or decompression procedure in a next-generation mobile communication system.

20 Claims, 10 Drawing Sheets

(56) References Cited

U.S. PATENT DOCUMENTS

| | | | |
|---|---|---|---|
| 11,729,667 B2* | 8/2023 | Xu | H04L 5/0053 370/230 |
| 11,792,302 B2* | 10/2023 | Zhang | H04L 69/04 |
| 11,805,439 B2* | 10/2023 | Kanamarlapudi | H04L 47/30 |
| 11,838,151 B1* | 12/2023 | Jones | H04L 25/0224 |
| 11,849,350 B2* | 12/2023 | Hori | H04W 76/20 |
| 11,889,349 B2* | 1/2024 | Dudda | H04L 45/66 |
| 11,924,795 B2* | 3/2024 | Kanamarlapudi | G01V 1/50 |
| 11,924,891 B2* | 3/2024 | Lee | H04W 74/004 |
| 11,956,667 B2* | 4/2024 | Xu | H04L 69/324 |
| 11,963,038 B2* | 4/2024 | Lu | H04W 28/06 |
| 11,991,575 B2* | 5/2024 | Falkenberg | H04W 36/033 |
| 12,001,375 B2* | 6/2024 | Wang | H04L 45/02 |
| 12,052,760 B2* | 7/2024 | Jeon | H04W 74/0833 |
| 12,095,530 B2* | 9/2024 | Grieco | H04W 72/21 |
| 12,096,291 B2* | 9/2024 | Babaei | H04W 36/0088 |
| 12,101,826 B2* | 9/2024 | Lee | H04W 74/0866 |
| 12,120,185 B2* | 10/2024 | Dudda | H04L 69/04 |
| 12,143,855 B2* | 11/2024 | Zhang | H04W 28/06 |
| 12,177,830 B2* | 12/2024 | Jeon | H04W 72/1263 |
| 12,237,919 B2* | 2/2025 | Zheng | H04L 1/1832 |
| 12,245,303 B2* | 3/2025 | Babaei | H04L 5/0048 |
| 2009/0034476 A1* | 2/2009 | Wang | H04W 28/06 370/310 |
| 2020/0137820 A1 | 4/2020 | Kim | |
| 2021/0136625 A1* | 5/2021 | Jo | H04W 76/11 |
| 2021/0195463 A1 | 6/2021 | Zhang et al. | |
| 2021/0258828 A1 | 8/2021 | Qiao et al. | |
| 2022/0377602 A1 | 11/2022 | Kim | |
| 2023/0113031 A1* | 4/2023 | Harada | H04W 76/12 370/328 |
| 2023/0140866 A1* | 5/2023 | Sharma | H04L 69/324 370/310 |
| 2023/0179685 A1* | 6/2023 | Madhur Comandur | H04L 69/04 370/235 |
| 2023/0180027 A1* | 6/2023 | Xu | H04L 1/16 370/329 |
| 2023/0269802 A1* | 8/2023 | Fu | H04W 76/11 455/500 |
| 2023/0284289 A1* | 9/2023 | Watts | H04W 76/19 370/329 |
| 2023/0308905 A1* | 9/2023 | Teyeb | H04L 5/0035 |
| 2023/0379842 A1* | 11/2023 | Inoue | H04L 5/0098 |
| 2023/0413108 A1* | 12/2023 | Eskelinen | H04L 1/1854 |
| 2024/0064841 A1* | 2/2024 | Jiang | H04W 28/065 |
| 2024/0080928 A1* | 3/2024 | Yue | H04W 72/21 |
| 2024/0121847 A1* | 4/2024 | Wang | H04W 76/19 |
| 2024/0187919 A1* | 6/2024 | Rossbach | H04L 1/0064 |
| 2024/0214862 A1* | 6/2024 | Wang | H04W 76/19 |
| 2025/0071654 A1* | 2/2025 | Ericson | H04W 28/0278 |

OTHER PUBLICATIONS

Samsung, "[AT116-e][007][NR1516] PDCP (Samsung)," R2-2111572, 3GPP TSG-RAN WG2 #116e, Electronic Meeting, Nov. 1-12, 2021, 15 pages.

Mediatek, "Clarification on joint EHC and RoHC operation," R2-2110757, 3GPP TSG-RAN WG2 Meeting #116-e, Electronic, Nov. 1-12, 2021, 3 pages.

Samsung, "[AT115-e][220][R17 DCCA] Bearer handling of SCG deactivation," 3GPP TSG-RAN WG2 #115e R2-2108862, Electronic Meeting, Aug. 16-27, 2021, 22 pages.

Supplementary European Search Report dated Jan. 29, 2025, in connection with European Patent Application No. 22911987.0, 9 pages.

ETSI TS 136 323 V13.6.0 (Jul. 2017), LTE· Evolved Universal Terrestrial Radio Access (E-UTRA); Packet Data Convergence Protocol (PDCP) specification (3GPP TS 36.323 version 13.6.0 Release 13), Jul. 2017, 42 pages.

\* cited by examiner

METHOD AND APPARATUS FOR EFFECTIVELY PERFORMING HEADER COMPRESSION OR DECOMPRESSION PROCEDURE IN NEXT-GENERATION MOBILE COMMUNICATION SYSTEM

CROSS-REFERENCE TO RELATED APPLICATION

This application is based on and claims priority under 35 U.S.C. § 119 to Korean Patent Application No. 10-2021-0186155, filed on Dec. 23, 2021, in the Korean Intellectual Property Office, the disclosures of which are herein incorporated by reference in their entireties.

BACKGROUND

1. Field

The disclosure relates to a method and apparatus for effectively performing a header compression or decompression procedure in a next-generation mobile communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" or a "post long term evolution (LTE) system." The 5G communication system is considered to be implemented in extremely high frequency (mmWave) bands (e.g., 60 GHz band) so as to accomplish higher data rates. To decrease propagation loss of the radio waves and increase the transmission distance, the beamforming, massive multiple-input multiple-output (massive MIMO), full dimensional MIMO (FD-MIMO), array antenna, an analog beamforming, large scale antenna techniques, etc. have been discussed and adopted in the 5G communication system. In addition, in the 5G communication systems, development for system network improvement is under way based on an advanced small cell, a cloud radio access network (cloud RAN), an ultra-dense network, device-to-device (D2D) communication, wireless backhaul, moving network, cooperative communication, coordinated multi-points (CoMP), reception-end interference cancellation, and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology.

Meanwhile, in the next-generation mobile communication system, there is a need to efficiently use transmission resources to support services requiring low latency and high reliability (e.g., a ultra-reliable low latency communication (URLLC) service or an industrial IoT (IIoT) service).

SUMMARY

Accordingly, the disclosure is intended to provide a method and apparatus for applying different header compression and decompression procedures depending on data types so that transmission resources for each service can be efficiently used.

An aspect of the disclosure is to provide a method performed by a transmitting device in a wireless communication system. The method includes receiving, at a packet data convergence protocol (PDCP) layer from an upper layer, PDCP service data unit (SDU); identifying whether an Ethernet header of the PDCP SDU includes a type field; in case that the Ethernet header of the PDCP SDU does not include the type field, processing the PDCP SDU using an Ethernet header compression (EHC) compressor by bypassing a robust header compression (ROHC) compressor; and transmitting, through a lower layer to a receiving device, the processed PDCP SDU.

Another aspect of the disclosure is to provide a method performed by a receiving device in a wireless communication system. The method includes receiving, at a packet data convergence protocol (PDCP) layer through a lower layer from a transmitting device, PDCP data protocol data unit (PDU); identifying whether an Ethernet header of the PDCP data PDU includes a type field; in case that the Ethernet header of the PDCP data PDU does not include the type field, processing the PDCP data PDU using an Ethernet header compression (EHC) compressor by bypassing a robust header compression (ROHC) compressor; and delivering, at the PDCP layer to an upper layer, the processed PDCP data PDU.

Another aspect of the disclosure is to provide a transmitting device in a wireless communication system. The transmitting device includes a transceiver and a controller configured to receive, at a packet data convergence protocol (PDCP) layer from an upper layer, PDCP service data unit (SDU); identify whether an Ethernet header of the PDCP SDU includes a type field; in case that the Ethernet header of the PDCP SDU does not include the type field, process the PDCP SDU using an Ethernet header compression (EHC)

compressor by bypassing a robust header compression (ROHC) compressor; and control the transceiver to transmit, through a lower layer to a receiving device, the processed PDCP SDU.

Another aspect of the disclosure is to provide a receiving device in a wireless communication system. The receiving device includes a transceiver and a controller configured to control the transceiver to receive, at a packet data convergence protocol (PDCP) layer through a lower layer from a transmitting device, PDCP data protocol data unit (PDU); identify whether an Ethernet header of the PDCP data PDU includes a type field; in case that the Ethernet header of the PDCP data PDU does not include the type field, process the PDCP data PDU using an Ethernet header compression (EHC) compressor by bypassing a robust header compression (ROHC) compressor; and deliver, at the PDCP layer to an upper layer, the processed PDCP data PDU.

According to the disclosure, in order for each of a terminal or a base station to perform a header compression procedure or a header decompression procedure, an EHC header compression method or an ROHC header compression method is configured and applied. In addition, by applying different compression procedures depending on the type of data received from an upper layer device or by applying different decompression procedures depending on the type of data received from a lower layer device, it is possible to efficiently use transmission resources.

Therefore, according to the disclosure, because more data can be sent with less transmission resources and a more reliable modulation method can be used, there is an effect of guaranteeing high reliability and low latency.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

In the descriptions below, a term used for identifying an access node, terms indicating network entities, terms indicating messages, a term indicating an interface between network entities, terms indicating various pieces of identification information, and the like are used for ease of description. Therefore, the disclosure may not be limited by the terminologies provided below, and other terms that indicate subjects having equivalent technical meanings may be used.

For ease of description, the disclosure uses terms and names defined in the 3rd generation partnership project long term evolution (3GPP LTE). However, the disclosure is not limited to the terms and the names, and may be equally applied to systems that comply with other standards. For ease of description, an evolved nodeB (eNB) and a "gNB" may be interchangeably used in the disclosure. That is, a base station that is described as eNB may indicate gNB.

Figure 1:
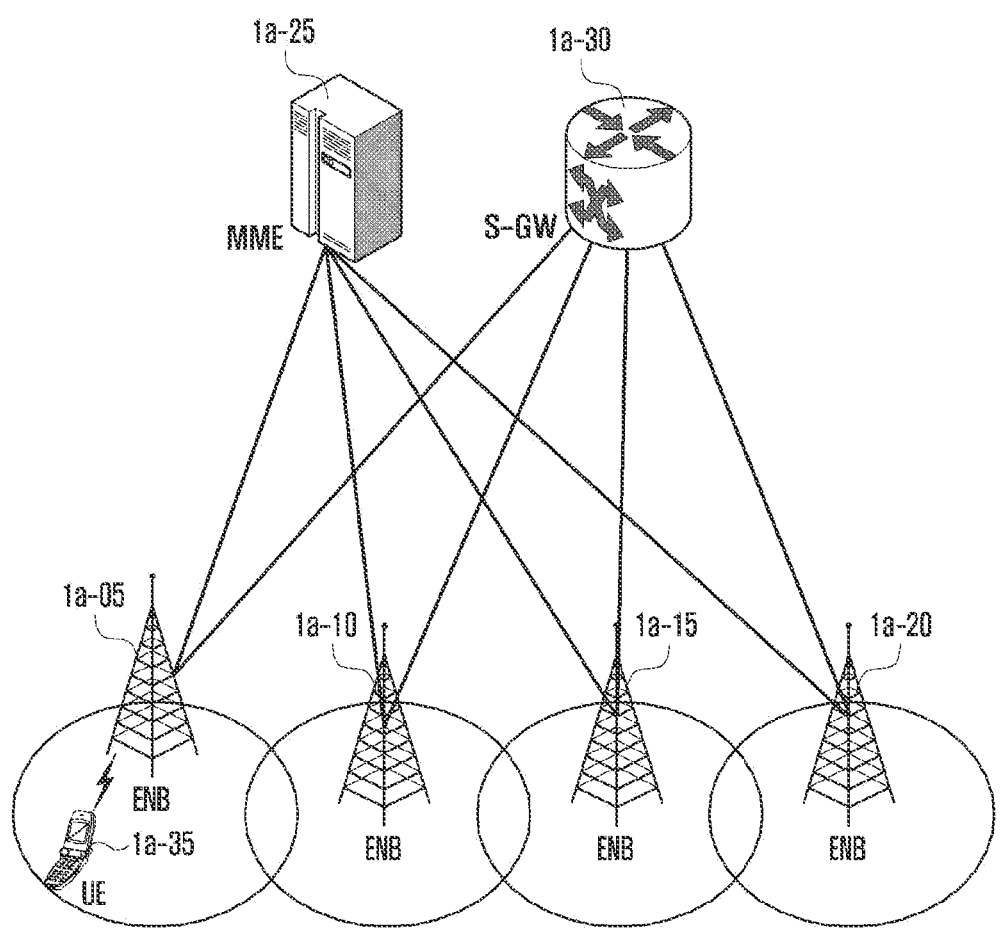
FIG. 1 illustrates a structure of an LTE system according to embodiments of the present disclosure.

FIG. 1 illustrates a structure of a long term evolution (LTE) system according to embodiment of the present disclosure.

With reference to FIG. 1, as illustrated, a radio access network of an LTE system is composed of next generation base stations (an evolved node B (ENB), a Node B, or a base station) 1a-05, 1a-10, 1a-15, and 1a-20, a mobility management entity (MME) 1a-25, and a serving-gateway (S-GW) 1a-30. A user equipment (UE) (or a terminal) 1a-35 may access an external network via the ENB 1a-05 to 1a-20 and the S-GW 1a-30.

In FIG. 1, the ENB 1a-05 to 1a-20 may correspond to a legacy node B in a universal mobile telecommunications system (UMTS). The ENB is connected to the UE 1a-35 via a wireless channel, and performs a more complicated role than the legacy node B. In the LTE system, real-time services, such as a voice over IP (VoIP) via an Internet protocol, and all user traffic may be provided via a shared channel. Accordingly, there is a desire for a device that performs scheduling by collecting state information of UEs, such as a buffer state, an available transmission power state, a channel state, and the like, and the ENB 1a-05 to 1a-20 may be in charge of scheduling. One ENB generally controls a plurality of cells. In order to implement a transmission rate of 100 Mbps, the LTE system uses an orthogonal frequency division multiplexing (OFDM) as a wireless access technology in a bandwidth of 20 MHz.

In addition, an adaptive modulation and coding (AMC) scheme that determines a modulation scheme and a channel coding rate may be applied based on the channel state of the UE. The S-GW 1a-30 is a device for providing a data bearer, and generates or removes a data bearer under the control of the MME 1a-25. The MME is a device that is in charge of various control functions in addition to a mobility management function associated with the UE, and may be connected to a plurality of base stations.

Figure 2:
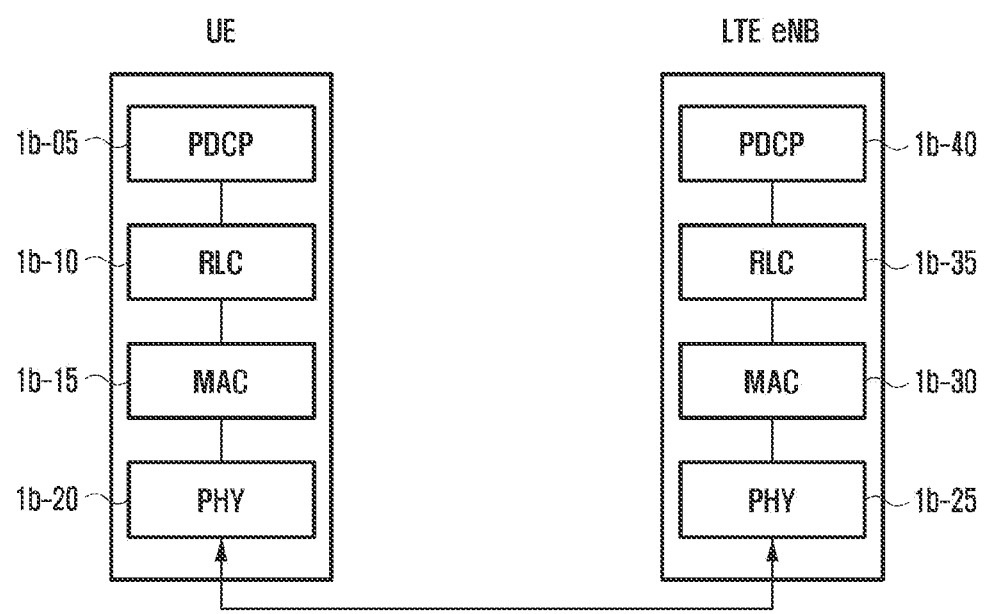
FIG. 2 illustrates a radio protocol architecture in the LTE system according to embodiments of the present disclosure.

FIG. 2 illustrates a radio protocol architecture in the LTE system according to embodiments of the present disclosure.

With reference to FIG. 2, the radio protocol of the LTE system includes, for each of a UE and an ENB, a packet data convergence protocol (PDCP) 1b-05 and 1b-40, a radio link control (RLC) 1b-10 and 1b-35, a medium access control (MAC) 1b-15 and 1b-30, and a physical layer (PHY) 1b-20 and 1b-25. The PDCP 1b-05 and 1b-40 may take charge of IP header compression/decompression, or the like. The main functions of the PDCP may be summarized as follows:

Header compression and decompression: robust header compression (ROHC) only,
Transfer of user data;
In-sequence delivery (In-sequence delivery of upper layer packet data units (PDUs) at PDCP re-establishment procedure for radio link control acknowledged mode (RLC AM));
Reordering (For split bearers in DC (only support for RLC AM): PDCP PDU routing for transmission and PDCP PDU reordering for reception);
Duplicate detection (Duplicate detection of lower layer service data units (SDUs) at PDCP re-establishment procedure for RLC AM);
Retransmission (Retransmission of PDCP SDUs at handover and, for split bearers in DC, of PDCP PDUs at PDCP data-recovery procedure, for RLC AM);
Ciphering and deciphering; and/or
Timer-based SDU discard (Timer-based SDU discard in uplink).

The RLC 1b-10 and 1b-35 may reconfigure a PDCP PDU into an appropriate size, and perform ARQ or the like. The main functions of an RLC may be summarized as follows:

Transfer of data (Transfer of upper layer PDUs);
Automatic repeat query (ARQ) (Error correction through ARQ (only for AM data transfer));
Concatenation, segmentation, and reassembly (Concatenation, segmentation and reassembly of RLC SDUs (only for un-acknowledge mode (UM) and AM data transfer));
Re-segmentation (Re-segmentation of RLC data PDUs (only for AM data transfer));
Reordering (Reordering of RLC data PDUs (only for UM and AM data transfer);
Duplicate detection (Duplicate detection (only for UM and AM data transfer));
Error detection (Protocol error detection (only for AM data transfer));
RLC SDU discard (RLC SDU discard (only for UM and AM data transfer)); and/or
RLC re-establishment.

The MAC 1b-15 and 1b-30 may be connected to various RLC layer devices configured for one UE, and may perform multiplexing of RLC PDUs to a MAC PDU and demultiplexing of RLC PDUs from a MAC PDU. The main functions of the MAC may be summarized as follows:

Mapping (Mapping between logical channels and transport channels);
Multiplexing and demultiplexing (Multiplexing/demultiplexing of MAC SDUs belonging to one or different logical channels into/from transport blocks (TB) delivered to/from the physical layer on transport channels);
Scheduling information reporting;
Hybrid automatic repeat request (HARQ) (error correction through HARQ);

Priority handling between logical channels (Priority handling between logical channels of one UE);
Priority handling between UEs (Priority handling between UEs by means of dynamic scheduling);
Multimedia broadcast/multicast service (MBMS) service identification;
Transport format selection: and/or
Padding.

The physical (PHY) layer 1b-20 and 1b-25 may perform an operation of channel-coding and modulating upper layer data to produce an OFDM symbol and transmitting the OFDM symbol to a wireless channel, or demodulating and channel-decoding an OFDM symbol received via a wireless channel and transmitting the demodulated and channel-decoded OFDM symbol to an upper layer.

Figure 3:
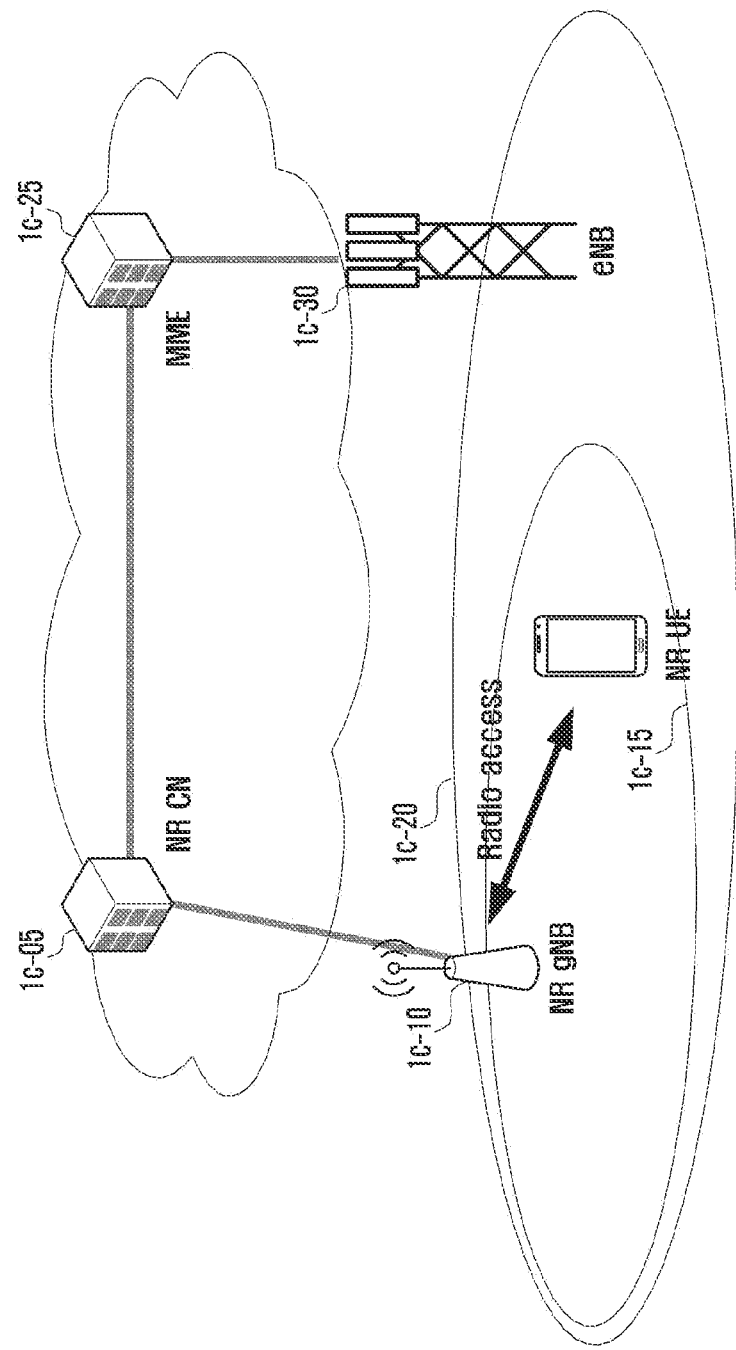
FIG. 3 illustrates a structure of a next-generation mobile communication system according to embodiments of the present disclosure.

FIG. 3 illustrates a structure of a next-generation mobile communication system according to embodiments of the present disclosure.

With reference to FIG. 3, as illustrated, a radio access network of the next generation mobile communication system (hereinafter NR or 5G) may be composed of a next generation base station (new radio node B, hereinafter NR gNB or NR base station) 1c-10 and a new radio core network (NR CN) 1c-05. A user equipment (new radio user equipment, hereinafter NR UE or terminal) 1c-15 may access an external network 1c-35 via the NR gNB 1c-10 and the NR CN 1c-05.

In FIG. 3, the NR gNB 1c-10 may correspond to an evolved Node B (eNB) in the legacy LTE system. The NR gNB is connected to the NR UE 1c-15 via a wireless channel, and may provide a better service compared to the legacy nodeB. In the next generation mobile communication system, all user traffics are serviced via a shared channel and thus, a device that collects state information of UEs, such as a buffer status, an available transmission power status, a channel status or the like, and performs scheduling is needed, and the NR NB 1c-10 takes charge of the same. One NR gNB generally controls a plurality of cells. In order to implement high-speed data transmission when compared to the currently used LTE, a bandwidth greater than or equal to the legacy maximum bandwidth may be needed, and an orthogonal frequency division multiplexing (OFDM) is used as a radio access technology, and beamforming technology is additionally used.

Also, an adaptive modulation and coding (AMC) scheme that determines a modulation scheme and a channel coding rate may be applied based on the channel state of a UE. The NR CN 1c-05 may support mobility, configures a bearer, or configures quality of service (QoS). The NR CN 1c-05 is a device that is in charge of various control functions in addition to a mobility management function associated with the UE 1c-15, and may be connected to a plurality of base stations. Also, the next generation mobile communication system may interoperate with the legacy LTE system, and the NR CN 1c-05 may be connected to the MME 1c-25 via a network interface. The MME 1c-25 may be connected to the eNB 1c-30 which is a legacy base station.

Figure 4:
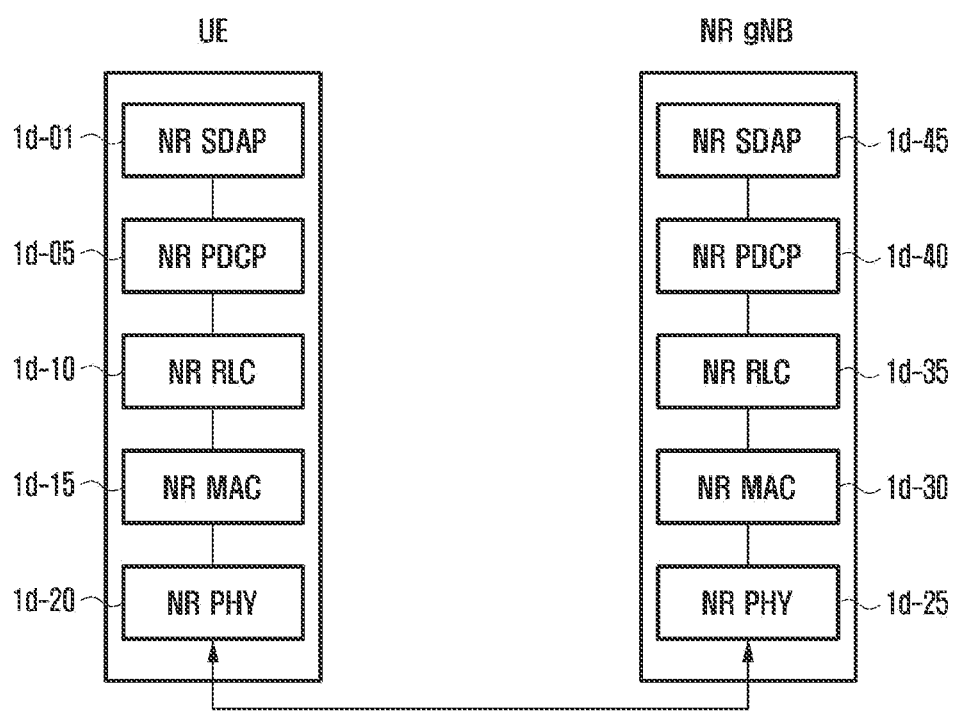
FIG. 4 illustrates a radio protocol architecture in the next-generation mobile communication system according to embodiments of the present disclosure.

FIG. 4 illustrates a radio protocol architecture in the next-generation mobile communication system according to embodiments of the present disclosure.

With reference to FIG. 4, a radio protocol of a next generation mobile communication system includes an NR service data adaptation protocol (SDAP) 1d-01 and 1d-45, an NR PDCP 1d-05 and 1d-40, an NR RLC 1d-10 and 1d-35, and an NR MAC 1d-15 and 1d-30 for each of a UE and an NR base station.

The main functions of the NR SDAP 1d-01 and 1d-45 may include a part of the functions as follows:
Transfer of user data (Transfer of user plane data);
Mapping between a QoS flow and a data radio bearer (DRB) for both downlink (DL) and uplink (UL);
Marking QoS flow identify (ID) for both DL and UL (Marking QoS flow ID in both DL and UL packets); and/or
Mapping reflective QoS flow to DRB for the UL SDAP PDUs (Reflective QoS flow to DRB mapping for the UL SDAP PDUs).

A UE may receive, via an radio resource control (RRC) message, a configuration associated with whether to use a header of the SDAP layer device or whether to use a function of the SDAP layer device, for each PDCP layer device, or for each bearer, or for each logical channel When a SDAP header is configured, the UE is directed, by a one-bit non-access stratum (NAS) reflective QoS indicator (NAS reflective QoS) and a one-bit AS reflective QoS indicator (AS reflective QoS) of the SDAP header, to update or reconfigure mapping information between a data bearer and a QoS flow of an uplink and a downlink. The SDAP header may include QoS flow ID information indicating QoS. The QoS information may be used as data processing priority for supporting smooth services, scheduling information or the like.

The main functions of the NR PDCP 1d-05 and 1d-40 may include a part of the functions as follows:
Header compression and decompression: ROHC only;
Transfer of user data;
In-sequence delivery (In-sequence delivery of upper layer PDUs);
Out-of-sequence delivery (Out-of-sequence delivery of upper layer PDUs);
Reordering (PDCP PDU reordering for reception);
Duplicate detection (Duplicate detection of lower layer SDUs);
Retransmission (Retransmission of PDCP SDUs);
Ciphering and deciphering; and/or
Timer-based SDU discard (Timer-based SDU discard in uplink).

The reordering function of the NR PDCP 1d-05 and 1d-40 may indicate a function of reordering PDCP PDUs received from a lower layer sequentially according to a PDCP sequence number (SN). The reordering function may include a function of sequentially transferring reordered data to an upper layer, may include a function of immediately transferring data without considering order, may include a function of performing reordering and recording lost PDCP PDUs, may include a function of reporting the states of lost PDCP PDUs to a transmission side, and may include a function of requesting retransmission of lost PDCP PDUs.

The main functions of the NR RLC 1d-10 and 1d-35 may include a part of the functions as follows:
Transfer of data (Transfer of upper layer PDUs);
In-sequence delivery (In-sequence delivery of upper layer PDUs);
Out-of-sequence delivery (Out-of-sequence delivery of upper layer PDUs);
ARQ (Error correction through ARQ);
Concatenation, segmentation, and reassembly (Concatenation, segmentation and reassembly of RLC SDUs);
Re-segmentation (Re-segmentation of RLC data PDUs);
Reordering (Reordering of RLC data PDUs);
Duplicate detection;
Error detection (Protocol error detection);
RLC SDU discard; and/or
RLC re-establishment.

The in-sequence delivery function of the NR RLC device may indicate a function of sequentially transferring RLC SDUs, received from a lower layer, to an upper layer. The in-sequence delivery function may include a function of reassembling RLC SDUs, which are segmented from an originally single RLC SDU, and transferring an RLC SDU, may include a function of reordering received RLC PDUs based on an RLC sequence number (SN) or PDCP sequence number (SN), may include a function of performing reordering and recording lost RLC PDUs, may include a function of reporting the states of lost RLC PDUs to a transmission side, may include a function of requesting retransmission of lost RLC PDUs, may include a function of sequentially transferring, to an upper layer, only RLC SDUs before a lost RLC SDU if a lost RLC SDU exists, may include a function of sequentially transferring, to an upper layer, all RLC SDU received before a timer starts if the timer expires although a lost RLC SDU exists, or may include a function of sequentially transferring, to an upper layer, all RLC SDUs received up to date, if a predetermined timer expires, although a lost RLC SDU exists. The RLC PDUs may be processed in order of arrival (irrespective of a sequence number) and may be transferred to a PDCP device randomly (out-of sequence delivery).

In the case of segments, a single RLC PDU is reconfigured by receiving segments which are stored in a buffer or are to be received in the future, and the RLC PDU may be transferred to the PDCP device. The NR RLC layer 1d-10 and 1d-35 may not include a concatenation function, and the function may be performed by the NR MAC layer 1d-15 and 1d-30 or may be replaced with the multiplexing function of the NR MAC layer 1d-10 and 1d-35.

The out-of-sequence deliver function of the NR RLC device may indicate a function of immediately transferring RLC SDUs, received from a lower layer, to an upper layer in any order. The out-of sequence delivery function may include a function of reassembling RLC SDUs which are segmented from an originally single RLC SDU, and transferring an RLC SDU, and may include a function of storing an RLC SN or PDCP SN of received RLC PDUs, performing reordering, and recording lost RLC PDUs.

The NR MAC layer 1d-15 and 1d-30 may be connected to a plurality of NR RLC layer devices configured for a single UE, and the main functions of the NR MAC 1d-15 and 1d-30 may include a part of the functions as follows:
Mapping (Mapping between logical channels and transport channels);
Multiplexing/demultiplexing (Multiplexing/demultiplexing of MAC SDUs);
Scheduling information reporting;
HARQ (Error correction through HARQ);
Priority handling between logical channels (Priority handling between logical channels of one UE);
Priority handling between UEs (Priority handling between UEs by means of dynamic scheduling);
MBMS service identification;
Transport format selection: and/or
Padding.

The NR PHY layer 1d-20 and 1d-25 may perform an operation of channel-coding and modulating upper layer data to produce an OFDM symbol and transmitting the OFDM symbol to a wireless channel, or demodulating and channel-decoding an OFDM symbol received via a wireless channel and transmitting the demodulated and channel-decoded OFDM symbol to an upper layer.

The disclosure provides a method for performing a header compression or decompression procedure by configuring an Ethernet header compression (EHC) header compression method and a robust header compression (ROHC) header compression method for a PDCP layer device when an Ethernet protocol is configured and used on the PDCP layer device as an upper layer device in the next-generation mobile communication system, and by applying different header compression procedures depending on the type of data received from an upper layer device or by applying different header decompression procedures depending on the type of data received from a lower layer device.

Figure 5:
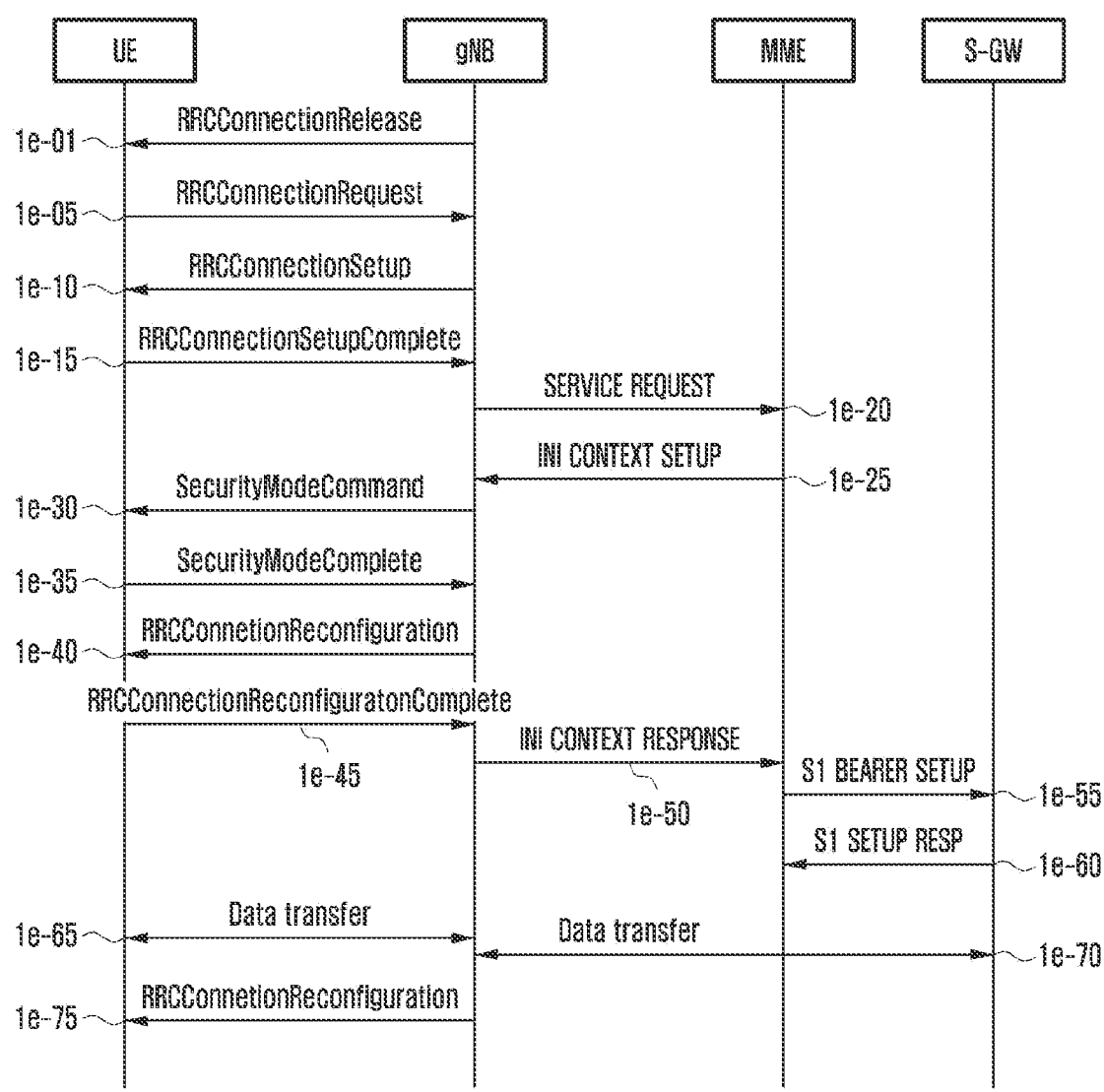
FIG. 5 illustrates a procedure in which a base station configures header compression or header decompression related configuration information to a UE when the UE establishes a connection with a network according to embodiments of the present disclosure.

FIG. 5 illustrates a procedure in which a base station configures header compression or header decompression related configuration information to a UE when the UE establishes a connection with a network according to embodiments of the present disclosure.

FIG. 5 illustrates a procedure in which a UE transitions from an RRC idle mode or an RRC inactive mode (or lightly-connected mode) to an RRC connected mode and establishes a connection with a network in the disclosure, and illustrates a procedure in which a base station configures header compression or header decompression related configuration information to the UE.

Specifically, PDCP layer device configuration information (pdcp-config) indicates whether to perform the EHC header compression method or the ROHC header compression method, and indicates whether to use each of the above header compression methods in only downlink, in only uplink, or in both uplink and downlink, and the configuration information related to the EHC header compression method may be configured only for a UE having UE capability to use the Ethernet protocol or only for a UE having UE capability to use the Ethernet header compression and decompression procedure. In the above, when reporting the UE capability to the base station, the UE may define a new indicator and report, to the base station by using the indicator, whether the UE can use the Ethernet protocol or use the Ethernet header compression and decompression procedure.

In addition, by configuring the type of Ethernet frame or Ethernet header to be used for each bearer, each logical channel, or each QoS flow, it is possible to configure the fields in the Ethernet header, the byte size of the Ethernet header, the bit size of each field in the Ethernet header, the field construction of the Ethernet header, or the like. Also, in the case where padding is added to the Ethernet frame in the RRC message, it is possible to indicate whether to configure a function of disallowing the padding to be transmitted in an actual wireless link by removing the padding at a transmitting end and adding the padding at a receiving end.

In FIG. 5, at 1e-01, the base station (gNB) transmits an RRCRelease message to the UE when the UE transmitting and receiving data in the RRC connected mode does not transmit or receive data for a predetermined reason or for a certain period of time, so that the UE can transition to the RRC idle mode or the RRC inactive mode. Thereafter, when data to be transmitted occurs, the UE (hereinafter, idle mode UE or INACTIVE UE) that currently have no established connection performs an RRC connection establishment process or an RRC connection resume procedure with the base station. At 1e-05, the UE establishes reverse transmission synchronization with the base station through a random access process and transmits an RRCSetupRequest message (in the case of a resume procedure, an RRCResumeRequest message) to the base station. This message contains a UE identifier, a cause for establishing a connection (establishmentCause), and the like.

At 1e-10, the base station transmits an RRCSetup message (in the case of a resume procedure, an RRCResume message) so that the UE establishes an RRC connection. This message may contain, for each logical channel (logicalchannelconfig), for each bearer, for each PDCP device (PDCP-config), or for each SDAP layer device, information indicating whether to use the Ethernet protocol, or whether to use the EHC header compression method or the ROHC header compression method. In addition, more specifically, only for a certain IP flow or a certain QoS flow in each logical channel, each bearer, or each PDCP device (or SDAP device), it may be indicated whether to use the Ethernet protocol or whether to use the EHC header compression method or the ROHC header compression method.

In another embodiment, by configuring, for the SDAP device, information about the IP flow or QoS flow that applies or does not apply the Ethernet protocol or uses or does not use the EHC header compression method or the ROHC header compression method, the SDAP device may instruct the PDCP device whether to apply the Ethernet protocol or whether to use the EHC header compression method or the ROHC header compression method for each QoS flow. In still another embodiment, the SDAP layer device or the PDCP device may identify each QoS flow, fields (e.g., Type field or Length field) of the Ethernet header, or fields of the header (e.g., TCP or IP header) of an upper layer device (e.g., TCP or IP layer device) by implementation, and determine whether to apply the Ethernet protocol or whether to apply the EHC header compression method or the ROHC header compression method.

In addition, if it is indicated to apply the Ethernet protocol or to use the EHC header compression method, the identifier or the buffer size to be used in applying the Ethernet protocol or in the EHC header compression method, a field size of a newly defined EHC header, or the like may be indicated. In addition, the above message may contain a setup or release command about applying the Ethernet protocol or performing the EHC header compression method or the ROHC header compression method. In addition, if it is configured to apply the Ethernet protocol or use the EHC header compression method or the ROHC header compression method, it may be configured with an RLC acknowledged mode (AM) bearer (a lossless mode with an ARQ function and a retransmission function) or an RLC unacknowledged mode (UM) bearer, and the EHC header compression method and the ROHC header compression method may be configured together to increase a compression rate.

In addition, the above message may indicate, for each logical channel (logicalchannelconfig), each bearer, or each PDCP device (PDCP-config), whether to use the function of the SDAP layer device or whether to use the SDAP header. Also, the above message may indicate, for each logical channel (logicalchannelconfig), each bearer, or each PDCP device (PDCP-config), whether to apply the EHC header compression method or the ROHC header compression method. Also, using each indicator, it may be indicated whether to apply the EHC header compression method or the ROHC header compression method for each of uplink and downlink.

For example, it may be configured to use the EHC header compression method or the ROHC header compression method in uplink and not to use it in downlink, or conversely, not to use it in uplink and to use it in downlink. Alternatively, it may be configured to be used in both directions of downlink and downlink. In addition, in the above message, an indicator of continuously using configuration information or context related to the EHC header compression method or the ROHC header compression method without initialization in case of handover (e.g., handover in the base station) or in case of transition from the RRC inactive mode to the RRC connected mode may be defined and indicated for uplink or downlink. In the case where the above identifier is configured when the SDAP layer device or the PDCP layer device is reestablished, the UE receiving the above indicator may enable the configuration information or context related to the EHC header compression method or the ROHC header compression method to be continuously used without initialization. By doing this, it is possible to reduce overhead due to reestablishment of the EHC header compression method or the ROHC header compression method. In addition, the RRC message may configure whether the SDAP protocol or the SDAP header is configured.

In addition, in the above message, by configuring the type of Ethernet frame or Ethernet header to be used for each bearer, each logical channel, or each QoS flow, it is possible to configure the fields in the Ethernet header, the byte size of the Ethernet header, the bit size of each field in the Ethernet header, the field construction of the Ethernet header, the bit size of each field in the newly defined EHC header, the field construction of the EHC header, or the like. Also, in the case where padding is added to the Ethernet frame, it is possible to indicate whether to configure a function of disallowing the padding to be transmitted in an actual wireless link by removing the padding at a transmitting end and adding the padding at a receiving end.

In addition, the above message contains RRC connection configuration information and the like. The RRC connection is also called a signaling radio bearer (SRB) and is used for transmitting and receiving RRC messages, which are control messages between the UE and the base station. At 1e-15, the UE that has established the RRC connection transmits an RRCSetupComplete message to the base station. If the base station does not know the UE capability of the UE currently establishing the connection or wants to know the UE capability, the base station may transmit a message inquiring the UE capability. Then, the UE may transmit a message reporting the UE capability. This message may indicate whether the UE can use the Ethernet protocol or support the EHC header compression method or the ROHC header compression method, and may contain an indicator indicating this. The RRCSetupComplete message contains a control message called SERVICE REQUEST in which the UE requests the MME to set up a bearer for a predetermined service.

The base station transmits the SERVICE REQUEST message contained in the RRCSetupComplete message to the MME at 1e-20, and the MME determines whether to provide the service requested by the UE. If it determined to provide the requested service, the MME transmits a message called INITIAL CONTEXT SETUP REQUEST to the base station at 1e-25. This message contains information such as quality of service (QoS) information to be applied upon configuring a data radio bearer (DRB) and security-related information (e.g., security key, security algorithm) to be applied to the DRB. To establish security with the UE, the base station transmits a SecurityModeCommand message at 1e-30 and receives a SecurityModeComplete message at 1e-35. When the security establishment is completed, the base station transmits an RRCReconfiguration message to the UE at 1e-40.

The above message (e.g., the RRCReconfiguration message) may contain, for each logical channel (logicalchannelconfig), for each bearer, for each PDCP device (PDCP-config), or for each SDAP layer device, information indicating whether to use the Ethernet protocol, or whether to use the EHC header compression method or the ROHC header compression method. In addition, more specifically, only for a certain IP flow or a certain QoS flow in each logical channel, each bearer, or each PDCP device (or SDAP device), it may be indicated whether to use the Ethernet protocol or whether to use the EHC header compression method or the ROHC header compression method.

In another embodiment, by configuring, for the SDAP device, information about the IP flow or QoS flow that applies or does not apply the Ethernet protocol or uses or does not use the EHC header compression method or the ROHC header compression method, the SDAP device may instruct the PDCP device whether to apply the Ethernet protocol or whether to use the EHC header compression method or the ROHC header compression method for each QoS flow. In still another embodiment, the SDAP layer device or the PDCP device may identify each QoS flow, fields (e.g., Type field or Length field) of the Ethernet header, or fields of the header (e.g., TCP or IP header) of an upper layer device (e.g., TCP or IP layer device) by implementation, and determine whether to apply the Ethernet protocol or whether to apply the EHC header compression method or the ROHC header compression method.

In addition, if it is indicated to apply the Ethernet protocol or to use the EHC header compression method, the identifier or the buffer size to be used in applying the Ethernet protocol or in the EHC header compression method, a field size of a newly defined EHC header, or the like may be indicated. In addition, the above message may contain a setup or release command about applying the Ethernet protocol or performing the EHC header compression method or the ROHC header compression method. In addition, if it is configured to apply the Ethernet protocol or use the EHC header compression method or the ROHC header compression method, it may be configured with an RLC AM bearer (a lossless mode with an ARQ function and a retransmission function) or an RLC UM bearer, and the EHC header compression method and the ROHC header compression method may be configured together to increase a compression rate. In addition, the above message may indicate, for each logical channel (logicalchannelconfig), each bearer, or each PDCP device (PDCP-config), whether to use the function of the SDAP layer device or whether to use the SDAP header.

Also, the above message may indicate, for each logical channel (logicalchannelconfig), each bearer, or each PDCP device (PDCP-config), whether to apply the EHC header compression method or the ROHC header compression method. Also, using each indicator, it may be indicated whether to apply the EHC header compression method or the ROHC header compression method for each of uplink and downlink. For example, it may be configured to use the EHC header compression method or the ROHC header compression method in uplink and not to use it in downlink, or conversely, not to use it in uplink and to use it in downlink. Alternatively, it may be configured to be used in both directions of downlink and downlink.

In addition, in the above message, an indicator of continuously using configuration information or context related to the EHC header compression method or the ROHC header compression method without initialization in case of handover (e.g., handover in the base station) or in case of transition from the RRC inactive mode to the RRC connected mode may be defined and indicated for uplink or downlink. In the case where the above identifier is configured when the SDAP layer device or the PDCP layer device is reestablished, the UE receiving the above indicator may enable the configuration information or context related to the EHC header compression method or the ROHC header compression method to be continuously used without initialization. By doing this, it is possible to reduce overhead due to reestablishment of the EHC header compression method or the ROHC header compression method. In addition, the RRC message may configure whether the SDAP protocol or the SDAP header is configured.

In addition, the above message contains configuration information of the DRB where user data will be processed, and the UE configures the DRB by applying this information and transmits an RRCReconfigurationComplete message to the base station at 1e-45. The base station that has completed DRB setup with the UE transmits an INITIAL CONTEXT SETUP COMPLETE message to the MME at 1e-50, and the MME that receives the INITIAL CONTEXT SETUP COMPLETE message exchanges an S1 BEARER SETUP message and an S1 BEARER SETUP RESPONSE message with the S-GW for S1 bearer setup at 1e-55 and 1e-60. The S1 bearer is a connection for data transmission established between the S-GW and the base station and corresponds one to one with the DRB. When all the above processes are completed, the UE transmits and receives data through the base station and the S-GW at 1e-65 and 1e-70. As such, the general data transfer process is largely composed of three steps: RRC connection setup, security setup, and DRB setup. In addition, the base station may transmit an RRC-ConnectionReconfiguration message to the UE at 1e-75 so as to update, add, or change the configuration for a predetermined reason.

Figure 6:
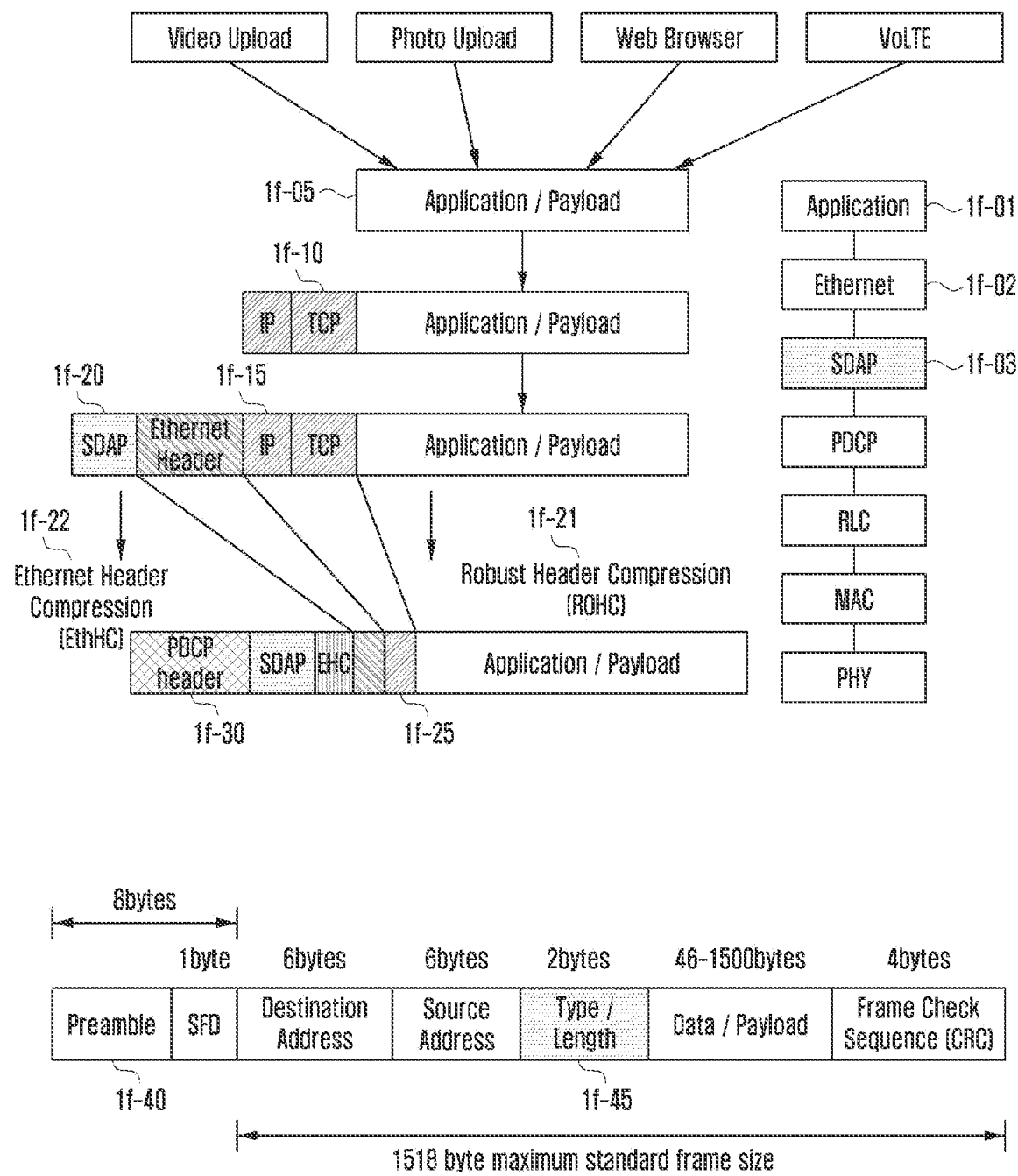
FIG. 6 illustrates a method for configuring, when an SDAP header or layer device is configured, an EHC or EthHC header compression method or an ROHC header compression method together, provided and performing each compression procedure according to embodiments of the present disclosure.

FIG. 6 illustrates a method for configuring, when an SDAP header or layer device is configured, an Ethernet header compression (EHC or EthHC) header compression method and an ROHC header compression method together and performing each compression procedure according to embodiments of the present disclosure.

In FIG. 6, upper layer data 1f-05 may be generated as data corresponding to services such as video upload, photo upload, web browser, and VoLTE. The data generated by an application layer device may be processed through TCP/IP, UDP, or a first protocol (e.g., a protocol other than the TCP or IP protocol) corresponding to a network data transport layer, or may be processed through the Ethernet protocol, processed in an SDAP layer device, construct each header 1f-10, 1f-15, or 1f-20 (upper layer header, Ethernet header, or SDAP header), and delivered to a PDCP layer. The PDCP layer may perform the following procedure upon receiving data (PDCP SDU) from an upper layer.

In FIG. 6, in the case where the first protocol 1f-01 (e.g., a protocol for generating and transmitting or receiving an IP packet, a protocol for generating or processing data to which the ROHC compression method is applicable, e.g., a TCP/IP protocol), the Ethernet protocol 1f-02 (e.g., a protocol for generating and transmitting or receiving an Ethernet packet (or Ethernet frame), a protocol for generating or processing data to which the EHC compression method is applicable), or the second protocol (e.g., a protocol for generating and transmitting or receiving data that is not an IP packet, a protocol for generating or processing data to which the ROHC compression method is not applicable, e.g., a protocol other than the TCP or IP protocol) is used or configured in an upper layer device, a header compression or decompression procedure for applying the EHC header compression method or the ROHC header compression method to data received from the upper layer device is provided.

If it is configured by the RRC message such as 1e-10, 1e-40, or 1e-75 in FIG. 5 that the ROHC header compression or EHC header compression method is used in the PDCP layer, the PDCP layer device may perform the EHC header compression method on the Ethernet header 1f-20 except the SDAP header as in 1f-22 or compress the TCP/IP header with the ROHC header compression method as in 1f-21a, then construct a separate EHC header 1f-40 having a field for indicating whether the Ethernet header is compressed, a field for indicating which fields of the Ethernet header are compressed (omitted) or not compressed (not omitted), or a context identifier field for identifying the type of compressed Ethernet header, and placing the EHC header before the compressed header.

If integrity verification is configured, a PDCP PDU may be constituted by performing integrity protection for the SDAP header, the PDCP header, the EHC header, the compressed headers (e.g., the Ethernet header compressed with the EHC compression method and the upper layer protocol header (e.g., the TCP or IP header) compressed with the ROHC compression method), and data, performing a ciphering procedure for the EHC header and the compressed headers (e.g., the Ethernet header compressed with the EHC compression method and the upper layer protocol header (e.g., the TCP or IP header) compressed with the ROHC compression method), and data (e.g., the ciphering procedure can be applied to all fields except the PDCP header and the SDAP header as data fields), and constructing the PDCP header 1f-30.

In the above, the PDCP layer device includes a header compression or decompression device, determines whether or not to perform header compression for each data as configured in the RRC message, and uses the header compression or decompression device. In the transmitting end, using the header compression device, a transmitting PDCP layer device compresses the Ethernet header or the upper layer header (e.g., TCP/IP header). In the receiving end, it is possible to perform a reordering procedure by reading the PDCP header of a received PDCP PDU, identifying a PDCP serial number, and constructing a COUNT value, perform a deciphering procedure on all fields except the PDCP header or the SDAP header based on the COUNT value, and, if the integrity protection procedure is configured, apply an integrity verification procedure on the PDCP header, the SDAP header, the EHC header, the compressed headers (e.g., the Ethernet header compressed with the EHC compression method and the upper layer protocol header (e.g., the TCP or IP header) compressed with the ROHC compression method), and data (e.g., all fields except for the 4-byte MAC-I field are applicable) (e.g., the integrity verification may be performed by applying the integrity verification procedure and comparing with the 4-byte MAC-I field value). In addition, based on the EHC decompression method or the ROHC decompression method, a receiving PDCP layer device performs the header decompression on the Ethernet header or the upper layer header (e.g., TCP/IP header) by using the header decompression device.

The above-described procedure of FIG. 6 can be applied to header compression of downlink data as well as when the UE compresses the uplink header. Also, the description of the uplink data can be equally applied to downlink data.

The above-described method for performing the EHC header compression on the Ethernet header provided in the disclosure is a method of reducing the size of the header by indicating only changed information while omitting fields indicating fixed information. Therefore, initially, it can be transmitted including all header information and configuration information for compression (e.g., an identifier (type) or serial number for each traffic (or service) for the Ethernet protocol, compression rate related information, etc.). Also, fields (e.g., a source address field, a destination address field (MAC address), a preamble field, a start of frame delimiter (SFD) field, a frame checksum (FCS) field, an Ethernet type field, etc.) corresponding to information not changed compared to the entire information initially transmitted are omitted or not transmitted, and the header is constructed to include only fields corresponding to changed information, so that the size of the header can be reduced.

In another embodiment, compressible fields and non-compressible fields are distinguished, and if the values of the compressible fields are not changed when compared with the field values of the initially transmitted complete header, only the compressible fields may be compressed (or omitted) and transmitted, and the non-compressible fields may be always transmitted without being compressed (or omitted). In addition, if even one of the compressible fields has a value changed from the field value of the previously transmitted complete header, the complete header may be transmitted again. In addition, whenever receiving the complete header, the receiving PDCP layer device may always transmit, to the transmitting PDCP layer device, a feedback indicating that the complete header has been successfully received. The feedback may be defined as PDCP control data (PDCP control PDU), and may include a context identifier to which the EHC compression method is applied, or may include an indicator indicating successful reception.

In addition, the provided EHC header compression method may not be applied to SDAP control data (SDAP control PDU) and SDAP header of the upper layer device. Therefore, in the network implementation, it is possible to schedule transmission resources quickly by reading QoS information or the like of the uncompressed SDAP control data or SDAP header. In the UE implementation, because the receiving end can read the QoS information from the SDAP control data or SDAP header before decompression, it is possible to simplify the implementation, and because the transmitting end can perform the SDAP control data or SDAP header generation in parallel with the header or data compression processing procedure or ciphering procedure of the PDCP layer device, it is possible to reduce data processing time. In addition, the EHC header compression method or ROHC header compression method provided in the disclosure may be applied only to the PDCP user data (PDCP data PDU) received from the upper layer and may not be applied to the PDCP control data (PDCP control PDU) generated by the PDCP layer device.

In FIG. 6, if the SDAP header or layer device is not configured, the above provided procedures may be performed while excluding the SDAP header.

Figure 7:
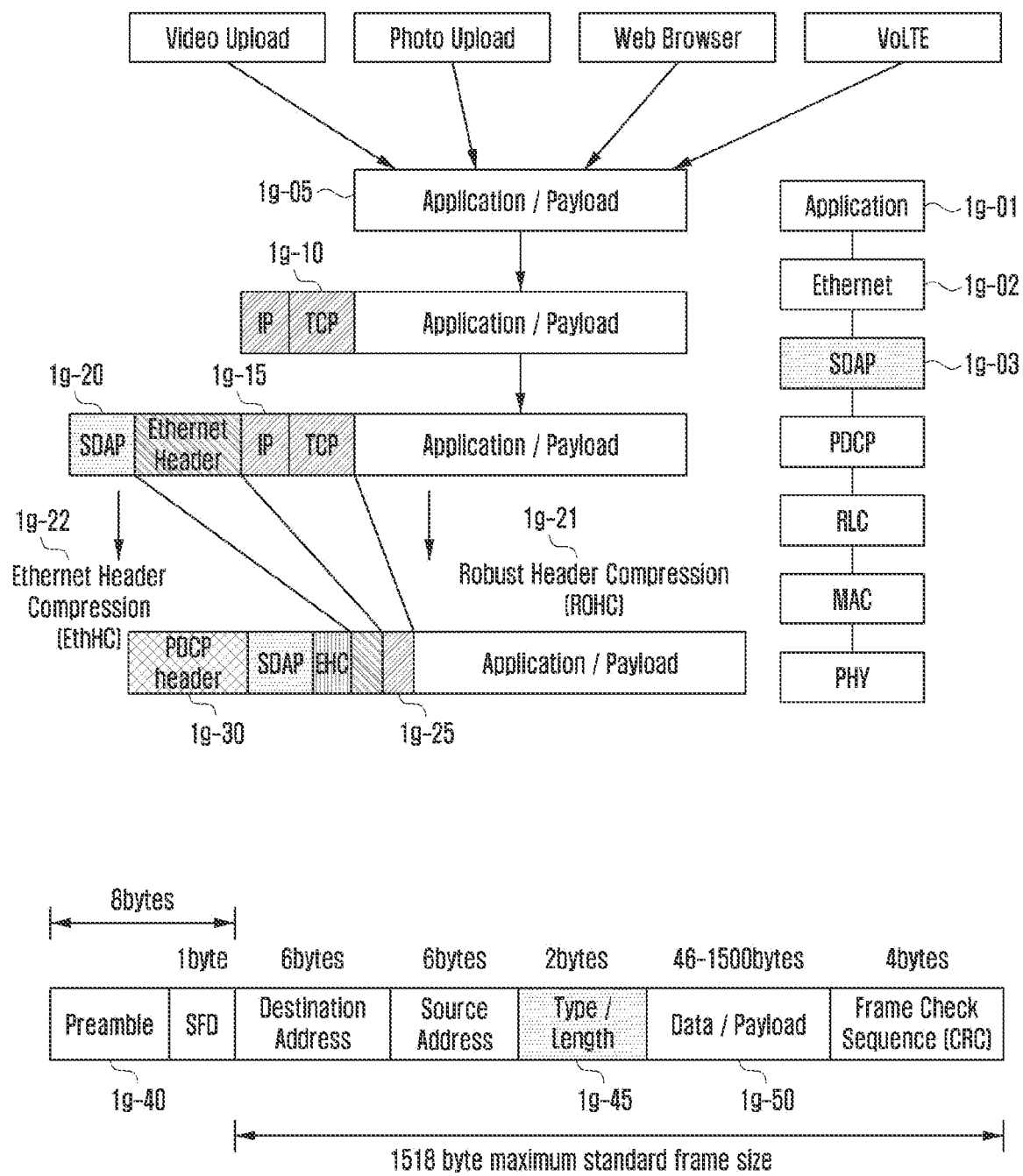
FIG. 7 illustrates a method for configuring an EHC header compression method or an ROHC header compression method together and performing each compression procedure depending on data of an upper layer device according to embodiments of the present disclosure.

FIG. 7 illustrates a method for configuring an EHC header compression method or an ROHC header compression method together and performing each compression procedure depending on data of an upper layer device according to embodiments of the present disclosure.

In FIG. 7, upper layer data 1g-05 may be generated as data corresponding to services such as video upload, photo upload, web browser, and VoLTE. The data generated by an application layer device may be processed through TCP/IP, UDP, or a first protocol (e.g., a protocol other than the TCP or IP protocol) corresponding to a network data transport layer, or may be processed through the Ethernet protocol, processed in an SDAP layer device, construct each header 1g-10, 1g-15, or 1g-20 (upper layer header, Ethernet header, or SDAP header), and delivered to a PDCP layer. The PDCP layer may perform the following procedure upon receiving data (PDCP SDU) from an upper layer.

In FIG. 7, in the case where the first protocol 1g-01 (e.g., a protocol for generating and transmitting or receiving an IP packet, a protocol for generating or processing data to which the ROHC compression method is applicable, e.g., a TCP/IP protocol), the Ethernet protocol 1g-02 (e.g., a protocol for generating and transmitting or receiving an Ethernet packet (or Ethernet frame), a protocol for generating or processing data to which the EHC compression method is applicable), or the second protocol (e.g., a protocol for generating and transmitting or receiving data that is not an IP packet, a protocol for generating or processing data to which the ROHC compression method is not applicable, e.g., a protocol other than the TCP or IP protocol) is used, configured, or mapped in an upper layer device, a header compression or decompression procedure for applying the EHC header compression method or the ROHC header compression method to data received from the upper layer device is provided. A packet obtained by data processing of an IP packet, generated by the first protocol, in the Ethernet protocol may be referred to as an IP Ethernet packet, and a packet obtained by data processing of data other than the IP packet, generated by the second protocol, in the Ethernet protocol may be referred to as a non-IP Ethernet packet.

If it is configured by the RRC message such as 1e-10, 1e-40, or 1e-75 in FIG. 5 that the ROHC header compression or EHC header compression method is used in the PDCP layer, the PDCP layer device may perform the EHC header compression method on the Ethernet header 1g-20 except the SDAP header as in 1g-22 or compress the TCP/IP header with the ROHC header compression method as in 1g-21a, then construct a separate EHC header 1g-40 having a field for indicating whether the Ethernet header is compressed, a field for indicating which fields of the Ethernet header are compressed (omitted) or not compressed (not omitted), or a context identifier field for identifying the type of compressed Ethernet header, and placing the EHC header before the compressed header.

As described in the disclosure, in the case where the Ethernet protocol is used on the PDCP layer device, different types of data may be processed in the PDCP layer device depending on the protocol type of the upper layer device 1g-01 (or protocol type that processes QoS flow data). For example, the PDCP layer device may receive data that is an IP packet generated by the first protocol 1g-01 (e.g., a protocol for generating and transmitting or receiving the IP packet, a protocol for generating or processing data to which the ROHC compression method is applicable, e.g., a TCP/IP protocol) from the upper layer device, or may receive data (non-IP packet) generated by the second protocol (e.g., a protocol for generating and transmitting or receiving data that is not the IP packet, a protocol for generating or processing data to which the ROHC compression method is not applicable, e.g., a protocol other than the TCP or IP protocol).

In the above, the Ethernet header, which is a header of an upper layer device data (Ethernet frame) that is a target of the EHC compression method, is as indicated by 1g-40. As in 1g-40, the Ethernet header is composed of a preamble field, a start frame delimiter (SFD) field, a destination address field, a source address field, a type field (or length field), a data field, and a CRC field. In the Ethernet header, depending on the version or function of the Ethernet protocol, the field corresponding to 1g-45 may be a type field or a length field. If the field corresponding to 1g-45 of the Ethernet header is the type field, the type field may indicate whether data 1g-50 generated from the protocol of the upper layer device is data corresponding to the IP packet (i.e., data generated from the first protocol) or data other than the IP packet (i.e., data generated from the second protocol).

Therefore, based on the type field, the transmitting PDCP layer device or the receiving PDCP layer device may determine whether data is an IP packet or not, or determine whether or not to apply the ROHC compression method (or decompression method). However, if the field corresponding to 1g-45 of the Ethernet header is the length field, there is no way to know whether the data 1g-50 generated from the protocol of the upper layer device is data corresponding to the IP packet (i.e., data generated from the first protocol) or data other than the IP packet (i.e., data generated from the second protocol). When the IP packet is included in 1g-50 in the Ethernet frame, it may be referred to as an IP Ethernet packet, or when data other than an IP packet is included in 1g-50 in the Ethernet frame, it may be referred to as a non-IP Ethernet packet.

For example, the transmitting PDCP layer device can know whether data of the upper layer device is data corresponding to the IP packet (i.e., data generated from the first protocol) or data other than the IP packet (i.e., data generated from the second protocol), but the receiving PDCP layer device cannot know whether it is data corresponding to the IP packet (i.e., data generated from the first protocol) or data other than the IP packet (i.e., data generated from the second protocol). For example, if the field corresponding to 1g-45 of the Ethernet header is the length field, the transmitting PDCP layer device examines the data and, in the case of the IP packet, applies the ROHC header compression method to the IP header and transmits it. However, the receiving PDCP layer device cannot know whether or not to perform the ROHC decompression procedure on the data because there is no way to know whether the data is data corresponding to the IP packet (i.e., data generated from the first protocol) or data other than the IP packet (i.e., data generated from the second protocol). Therefore, a decompression failure problem may occur or an error may occur because decompression is not performed.

Therefore, to solve the above problem, a first embodiment is provided below for performing different compression or decompression procedures depending on data of the upper layer device when the Ethernet protocol is used on the PDCP layer device or when the EHC header compression method and the ROHC header compression method, provided in the disclosure, are configured together.

In order to prevent the above-described problem, the first embodiment provides a procedure in which the transmitting PDCP layer device or the receiving PDCP layer device does not apply the ROHC compression method or the ROHC decompression method to data (e.g., PDCP SDU or PDCP data PDU) of the upper layer device in the case of failing to know whether the type of data (e.g., PDCP SDU or PDCP data PDU) of the upper layer device is an IP packet or non-IP packet data (or in the case where the type field is not contained in the Ethernet header or the length field is contained in the Ethernet header), or in the case of non-IP packet data (or non-IP Ethernet packet).

In the first embodiment, when the Ethernet protocol is used on the PDCP layer device or when the EHC header compression method and the ROHC header compression method, provided in the disclosure, are configured together, the first-first embodiment provided in the disclosure or the operation of the PDCP layer device is as follows.

If data (e.g., PDCP SDU) including the non-IP Ethernet packet or data (e.g., PDCP SDU) including an unknown packet (or a packet of unidentifiable type, or an unidentifiable packet whether it is the IP Ethernet packet or the non-IP Ethernet packet) is received from the upper layer device, the EHC compression method (or EHC compressor) may bypass (or may not apply) the ROHC compression method (or ROHC compressor), and the data (EHC compressed non-IP Ethernet packet or EHC compressed packet) to which the EHC compression method is applied may be delivered to the lower layer device.

If data (e.g., PDCP data PDU) including the non-IP Ethernet packet or data (e.g., PDCP data PDU) including an unknown packet (or a packet of unidentifiable type, or an unidentifiable packet whether it is the IP Ethernet packet or the non-IP Ethernet packet) is received from the lower layer device, the EHC decompression method (or EHC decompressor) may bypass (or may not apply) the ROHC decompression method (or ROHC decompressor), and the data (EHC decompressed non-LP Ethernet packet or EHC decompressed packet) to which the EHC decompression method is applied may be delivered to the upper layer device.

If data (e.g., PDCP SDU) including the IP Ethernet packet is received from the upper layer device, the EHC compression method (or EHC compressor) may be sent to (or may apply) the ROHC compression method (or ROHC compressor), and the data (EHC or ROHC compressed IP Ethernet packet or EHC or ROHC compressed packet) to which the EHC compression method or the ROHC compression method is applied may be delivered to the lower layer device.

If data (e.g., PDCP data PDU) including the IP Ethernet packet is received from the lower layer device, the EHC decompression method (or EHC decompressor) may be sent to (or may apply) the ROHC decompression method (or ROHC decompressor), and the data (EHC or ROHC decompressed IP Ethernet packet or EHC or ROHC decompressed packet) to which the EHC decompression method or the ROHC decompression method is applied may be delivered to the upper layer device.

In the first embodiment, when the Ethernet protocol is used on the PDCP layer device or when the EHC header compression method and the ROHC header compression method, provided in the disclosure, are configured together, the first-second embodiment provided in the disclosure is as follows. For example, in the case of the Ethernet packet that does not contain the type field in the Ethernet header, because it is unknown whether 1g-50 contains the IP packet or the non-IP packet, the operation of the PDCP layer device considering this is provided.

If data (e.g., PDCP SDU) including the non-IP Ethernet packet or data (e.g., PDCP SDU) including the Ethernet packet that does not contain the type field in the Ethernet header is received from the upper layer device, the EHC compression method (or EHC compressor) may bypass (or may not apply) the ROHC compression method (or ROHC compressor), and the data (EHC compressed non-IP Ethernet packet or EHC compressed packet) to which the EHC compression method is applied may be delivered to the lower layer device.

If data (e.g., PDCP data PDU) including the non-IP Ethernet packet or data (e.g., PDCP data PDU) including the Ethernet packet that does not contain the type field in the Ethernet header is received from the lower layer device, the EHC decompression method (or EHC decompressor) may bypass (or may not apply) the ROHC decompression method (or ROHC decompressor), and the data (EHC decompressed non-IP Ethernet packet or EHC decompressed packet) to which the EHC decompression method is applied may be delivered to the upper layer device.

If data (e.g., PDCP SDU) including the IP Ethernet packet is received from the upper layer device, the EHC compression method (or EHC compressor) may be sent to (or may apply) the ROHC compression method (or ROHC compressor), and the data (EHC or ROHC compressed IP Ethernet packet or EHC or ROHC compressed packet) to which the EHC compression method or the ROHC compression method is applied may be delivered to the lower layer device.

If data (e.g., PDCP data PDU) including the IP Ethernet packet is received from the lower layer device, the EHC decompression method (or EHC decompressor) may be sent to (or may apply) the ROHC decompression method (or ROHC decompressor), and the data (EHC or ROHC decompressed IP Ethernet packet or EHC or ROHC decompressed packet) to which the EHC decompression method or the ROHC decompression method is applied may be delivered to the upper layer device.

In the first embodiment, when the Ethernet protocol is used on the PDCP layer device or when the EHC header compression method and the ROHC header compression method, provided in the disclosure, are configured together, the first-third embodiment provided in the disclosure is as follows. For example, in the case of the Ethernet packet that contains the length field in the Ethernet header, because there is no type field and thus it is unknown whether 1g-50 contains the IP packet or the non-IP packet, the operation of the PDCP layer device considering this is provided.

If data (e.g., PDCP SDU) including the non-IP Ethernet packet or data (e.g., PDCP SDU) including the Ethernet packet that contains the length field in the Ethernet header is received from the upper layer device, the EHC compression method (or EHC compressor) may bypass (or may not apply) the ROHC compression method (or ROHC compressor), and the data (EHC compressed non-IP Ethernet packet or EHC compressed packet) to which the EHC compression method is applied may be delivered to the lower layer device.

If data (e.g., PDCP data PDU) including the non-IP Ethernet packet or data (e.g., PDCP data PDU) including the Ethernet packet that contains the length field in the Ethernet header is received from the lower layer device, the EHC decompression method (or EHC decompressor) may bypass (or may not apply) the ROHC decompression method (or ROHC decompressor), and the data (EHC decompressed non-IP Ethernet packet or EHC decompressed packet) to which the EHC decompression method is applied may be delivered to the upper layer device.

If data (e.g., PDCP SDU) including the IP Ethernet packet is received from the upper layer device, the EHC compression method (or EHC compressor) may be sent to (or may apply) the ROHC compression method (or ROHC compressor), and the data (EHC or ROHC compressed IP Ethernet packet or EHC or ROHC compressed packet) to which the EHC compression method or the ROHC compression method is applied may be delivered to the lower layer device.

If data (e.g., PDCP data PDU) including the IP Ethernet packet is received from the lower layer device, the EHC decompression method (or EHC decompressor) may be sent to (or may apply) the ROHC decompression method (or ROHC decompressor), and the data (EHC or ROHC decompressed IP Ethernet packet or EHC or ROHC decompressed packet) to which the EHC decompression method or the ROHC decompression method is applied may be delivered to the upper layer device.

Therefore, to solve the above problem, a second embodiment is provided below for performing different compression or decompression procedures depending on data of the upper layer device when the Ethernet protocol is used on the PDCP layer device or when the EHC header compression method and the ROHC header compression method, provided in the disclosure, are configured together.

In the second embodiment, only when the type field is used (or the length field is not used) in the Ethernet header of the Ethernet frame data-processed by the Ethernet protocol, the base station may apply (or restrict) a configuration method, for a bearer mapped with the Ethernet protocol, in which the EHC compression method and the ROHC compression method are configured together or the ROHC compression method is configured. As another configuration method, if for a certain bearer, the EHC compression method and the ROHC compression method are configured together or the ROHC compression method is configured, the type field may be used (or the length field may not be used) or only a format that contains the type field (or does not contains the length field) may be used (or supported), in the Ethernet header of the Ethernet packet (or Ethernet frame) contained in data (PDCP SDU or PDCP data PDU) received in the bearer. That is, a format containing the length field in the Ethernet header of the Ethernet packet (or Ethernet frame) may not be supported.

Therefore, in the second embodiment, because the Ethernet header of the Ethernet packet always contains the type field in the case that the EHC compression method or the ROHC compression method is configured, it is possible to know whether 1g-50 contains the IP packet or the non-IP packet. Therefore, based on the above configuration method, the following operation of the PDCP layer device is provided.

If data (e.g., PDCP SDU) including the non-IP Ethernet packet is received from the upper layer device, the EHC compression method (or EHC compressor) may bypass (or may not apply) the ROHC compression method (or ROHC compressor), and the data (EHC compressed non-IP Ethernet packet or EHC compressed packet) to which the EHC compression method is applied may be delivered to the lower layer device.

If data (e.g., PDCP data PDU) including the non-IP Ethernet packet is received from the lower layer device, the EHC decompression method (or EHC decompressor) may bypass (or may not apply) the ROHC decompression method (or ROHC decompressor), and the data (EHC decompressed non-IP Ethernet packet or EHC decompressed packet) to which the EHC decompression method is applied may be delivered to the upper layer device.

If data (e.g., PDCP SDU) including the IP Ethernet packet is received from the upper layer device, the EHC compression method (or EHC compressor) may be sent to (or may apply) the ROHC compression method (or ROHC compressor), and the data (EHC or ROHC compressed IP Ethernet packet or EHC or ROHC compressed packet) to which the EHC compression method or the ROHC compression method is applied may be delivered to the lower layer device.

If data (e.g., PDCP data PDU) including the IP Ethernet packet is received from the lower layer device, the EHC decompression method (or EHC decompressor) may be sent to (or may apply) the ROHC decompression method (or ROHC decompressor), and the data (EHC or ROHC decompressed IP Ethernet packet or EHC or ROHC decompressed packet) to which the EHC decompression method or the ROHC decompression method is applied may be delivered to the upper layer device.

A method for performing data processing in the PDCP layer device by applying the first or second embodiment provided in the disclosure is as follows.

If integrity verification is configured, a PDCP PDU may be constituted by performing integrity protection for the SDAP header, the PDCP header, the EHC header, the compressed headers (e.g., the Ethernet header compressed with the EHC compression method and the upper layer protocol header (e.g., the TCP or IP header) compressed with the ROHC compression method), and data, performing a ciphering procedure for the EHC header and the compressed headers (e.g., the Ethernet header compressed with the EHC compression method and the upper layer protocol header (e.g., the TCP or IP header) compressed with the ROHC compression method), and data (e.g., the ciphering procedure can be applied to all fields except the PDCP header and the SDAP header as data fields), and constructing the PDCP header 1g-30.

In the above, the PDCP layer device includes a header compression or decompression device, determines whether or not to perform header compression for each data as configured in the RRC message, and uses the header compression or decompression device. In the transmitting end, using the header compression device, a transmitting PDCP layer device compresses the Ethernet header or the upper layer header (e.g., TCP/IP header). In the receiving end, it is possible to perform a reordering procedure by reading the PDCP header of a received PDCP PDU, identifying a PDCP serial number, and constructing a COUNT value, perform a deciphering procedure on all fields except the PDCP header or the SDAP header based on the COUNT value, and, if the integrity protection procedure is configured, apply an integrity verification procedure on the PDCP header, the SDAP header, the EHC header, the compressed headers (e.g., the Ethernet header compressed with the EHC compression method and the upper layer protocol header (e.g., the TCP or IP header) compressed with the ROHC compression method), and data (e.g., all fields except for the 4-byte MAC-I field are applicable) (e.g., the integrity verification may be performed by applying the integrity verification procedure and comparing with the 4-byte MAC-I field value). In addition, based on the EHC decompression method or the ROHC decompression method, a receiving PDCP layer device performs the header decompression on the Ethernet header or the upper layer header (e.g., TCP/IP header) by using the header decompression device.

The above-described procedure of FIG. 7 can be applied to header compression of downlink data as well as when the UE compresses the uplink header. Also, the description of the uplink data can be equally applied to downlink data.

The above-described method for performing the EHC header compression on the Ethernet header provided in the disclosure is a method of reducing the size of the header by indicating only changed information while omitting fields indicating fixed information. Therefore, initially, it can be transmitted including all header information and configuration information for compression (e.g., an identifier (type) or serial number for each traffic (or service) for the Ethernet protocol, compression rate related information, etc.). Also, fields (e.g., a source address field, a destination address field (MAC address), a preamble field, a start of frame delimiter (SFD) field, a frame checksum (FCS) field, an Ethernet type field, etc.) corresponding to information not changed compared to the entire information initially transmitted are omitted or not transmitted, and the header is constructed to include only fields corresponding to changed information, so that the size of the header can be reduced.

In another embodiment, compressible fields and non-compressible fields are distinguished, and if the values of the compressible fields are not changed when compared with the field values of the initially transmitted complete header, only the compressible fields may be compressed (or omitted) and transmitted, and the non-compressible fields may be always transmitted without being compressed (or omitted). In addition, if even one of the compressible fields has a value changed from the field value of the previously transmitted complete header, the complete header may be transmitted again. In addition, whenever receiving the complete header, the receiving PDCP layer device may always transmit, to the transmitting PDCP layer device, a feedback indicating that the complete header has been successfully received.

In addition, the provided EHC header compression method may not be applied to SDAP control data (SDAP control PDU) and SDAP header of the upper layer device. Therefore, in the network implementation, it is possible to schedule transmission resources quickly by reading QoS information or the like of the uncompressed SDAP control data or SDAP header. In the UE implementation, because the receiving end can read the QoS information from the SDAP control data or SDAP header before decompression, it is possible to simplify the implementation, and because the transmitting end can perform the SDAP control data or SDAP header generation in parallel with the header or data compression processing procedure or ciphering procedure of the PDCP layer device, it is possible to reduce data processing time. In addition, the EHC header compression method or ROHC header compression method provided in the disclosure may be applied only to the PDCP user data (PDCP data PDU) received from the upper layer and may not be applied to the PDCP control data (PDCP control PDU) generated by the PDCP layer device.

In FIG. 7, if the SDAP header or layer device is not configured, the above provided procedures may be performed while excluding the SDAP header.

As provided above in the disclosure, upon receiving data from the upper layer device in the Ethernet header compression protocol 1*f*-22, the PDCP layer device may check the Ethernet header, compress the Ethernet header by using a protocol to compress the Ethernet header, and define and use a new header 1*f*-40 before the compressed Ethernet header. In the above, ciphering may be performed on the new header 1*f*-40.

This is because the data processing procedure can be simplified if the new header is regarded as data generated by the PDCP layer device and processed like data.

In the case of applying the header compression method provided in the disclosure, it is necessary to know which fields are compressed, omitted, or not transmitted in order to decompress the compressed Ethernet header at the receiving end. Therefore, upon compressing the Ethernet header, the transmitting end may define a new header (e.g., EHC header) and attach the new header to the front of the compressed Ethernet header before transmission. By defining a new first field in the new EHC header, it is possible to indicate which field among a plurality of fields of the Ethernet header is compressed, omitted, or not transmitted (e.g., a context identifier), and alternatively the new field may indicate whether a specific field is compressed (or omitted or not transmitted) or not compressed (or contained or transmitted) with each bit in a bitmap format.

In addition, because the first field can indicate which field in the Ethernet header is compressed (or omitted) or not compressed (or contained), the receiving end can calculate the size of the received compressed Ethernet header by using the first field. That is, the size of the compressed Ethernet header can be obtained by subtracting the size of the omitted header field from the size of the original Ethernet header.

In addition, even though the first field may have a mapping to indicate whether compression or not (or omission or not) of all fields of the Ethernet header, this mapping may be limited to compressible (or omissible) fields among fields of the Ethernet header. This can reduce the overhead of the new EHC header.

In addition, a 1-bit indicator may be defined in the new EHC header, and this indicator may indicate whether the Ethernet header (or SDAP header) is compressed or not compressed. This 1-bit indicator may also be defined and used in the PDCP header.

In addition, in order to accurately indicate the size of the compressed Ethernet header (e.g., for convenience of implementation), the EHC header may indicate the size or length of the compressed Ethernet header through a second field. In addition, when the size of the Ethernet header can have a plurality of types, the second field may also indicate which type. Contrary to this, a new third field indicating whether Ethernet header compression is performed or not may be defined in the EHC header.

In another embodiment, an identifier indicating a plurality of Ethernet header compression methods may be defined and used in the EHC header. This identifier may also indicate an Ethernet header type or QoS flow identifier. This is because a plurality of upper layer headers (e.g., various types of Ethernet headers) with different header structures are composed of different fields, and because the method of which fields are to be compressed and not compressed should be changed accordingly. Thus, for example, a first identifier indicating a header type or content may indicate applying a first Ethernet header compression method, and a second identifier may indicate applying a second Ethernet header compression method. Therefore, in the case that a plurality of data streams or QoS flows are mapped to one PDCP layer device, different header compression methods can be applied by using such new identifiers, and different decompression methods can be performed by distinguishing them at the receiving end.

In the disclosure, the Ethernet header compression method can be applied not only to the Ethernet header but also to a general upper layer device header, and the above header compression method is referred to as the Ethernet header compression method in the disclosure for convenience.

In addition, the constitution of Ethernet header fields depending on the type of the Ethernet header may be configured for each bearer using the RRC message as described in FIG. 5. For example, by configuring information on the type of upper layer header (e.g., Ethernet header type) configurable in the upper layer device of each bearer and by configuring identifiers mapped to each header type, they may be applied to the header compression or decompression method. That is, an identifier or indicator indicating the type of the Ethernet header may be defined and used in the new header. In addition, a checksum field may be contained in the new header so that the receiving end can determine whether decompression of the Ethernet header is successful. Also, a field indicating initialization of a buffer for compression in the transmitting PDCP layer device and a buffer for decompression in the receiving PDCP layer device may be defined and used. Such fields defined in the new header may be defined and used in a PDCP header or SDAP header.

In addition, in the new EHC header, a field indicating a feedback request when the receiving PDCP layer device successfully receives data may be defined and used. That is, by allowing the receiving PDCP layer device to transmit feedback only when there is a request from the transmitting PDCP layer device through the indicator, instead of always sending feedback whenever a complete header is received, overhead can be reduced.

Another Ethernet header compression method may be utilized based on the new EHC header. For example, when the transmitting end compresses the Ethernet header, compression is performed in order. At this time, if header field values are not changed compared to previously transmitted Ethernet header fields, they are compressed (omitted) and the first field is configured accordingly. If the Ethernet header field value is different from the previously transmitted Ethernet header field value, the the Ethernet header field is not compressed (contained) and the first field is configured accordingly.

As such, Ethernet header compression can be completed. In the above, the order may be determined in ascending order based on the PDCP serial number or COUNT value, and the previous Ethernet header may indicate an Ethernet header corresponding to data having a PDCP serial number or COUNT value as small as 1. Upon receiving the compressed Ethernet header, the receiving end may check the first field, restore the compressed (omitted) fields in the Ethernet header because they have the same values as the fields of the previously received Ethernet header, and newly update the uncompressed (contained) fields. The transmitting end and the receiving end may have separate buffers for compressing the Ethernet header, update the buffer whenever compressing the Ethernet header, and update the buffer whenever decompressing the Ethernet header. When recovering the compressed Ethernet header, the receiving end may remove the new EHC header and deliver the restored data to the upper layer. In addition, the transmitting end may send the entire Ethernet header information when initially transmitting the Ethernet header. That is, at first, transmission may be made without Ethernet header compression so that the receiving end can grasp the entire Ethernet header information.

The disclosure provides the operation of the transmitting PDCP layer device and the operation of the receiving PDCP layer device when the provided upper layer compression and decompression method (Ethernet header compression method) or ROHC (compression and decompression method for an upper layer such as TCP/IP or UDP) is configured.

The operation of the transmitting PDCP layer device of the UE or the base station, provided in the disclosure, is as follows.

When processing data, the transmitting PDCP layer device uses a first COUNT variable to hold a COUNT value to be assigned to next transmitted data, and the first COUNT variable may be named TX_NEXT.

The operation of the transmitting PDCP layer device provided in the disclosure is as follows.

The transmitting PDCP layer device triggers a PDCP data discard timer upon receiving data (e.g., PDCP SDU) from an upper layer, and discards the data upon expiration of the timer.

Also, it assigns a COUNT value corresponding to TX_NEXT to the data received from the upper layer. TX_NEXT may be set to 0 as an initial value, and TX_NEXT maintains a COUNT value for next data (PDCP SDU) to be transmitted.

If the header compression protocol (ROHC) is configured for the transmitting PDCP layer device, header compression is performed on the data.

If the upper layer header compression protocol (Ethernet header compression method, EHC) is configured for the transmitting PDCP layer device, and if the data received from the upper layer is data received first after the Ethernet header compression method is configured, if even one of field values of compressible fields among fields of the Ethernet header of the data received from the upper layer is different from a field value stored in a buffer of the transmitting PDCP layer device (or different from field values of the previously transmitted Ethernet header), or if feedback has not yet been received from the receiving PDCP layer device that previously transmitted data with a complete, uncompressed upper layer header (Ethernet header) has been successfully received, the transmitting PDCP layer device does not perform the Ethernet header compression until feedback is received from the receiving PDCP layer device that a complete, uncompressed upper layer header (Ethernet header) has been successfully received.

In one embodiment, if the upper layer header compression protocol (Ethernet header compression method, EHC) is configured for the transmitting PDCP layer device, and If feedback has been received from the receiving PDCP layer device that previously transmitted data with a complete, uncompressed upper layer header (Ethernet header) has been successfully received, the transmitting PDCP layer device performs compression by applying the Ethernet header compression method to the data received from the upper layer.

If integrity protection is configured for the transmitting PDCP layer device, a PDCP header is created, and the integrity protection is performed on the PDCP header and the data by using a security key and a COUNT value of TX_NEXT assigned to the data.

Also, a ciphering procedure is performed on the data by using the security key and the COUNT value of TX_NEXT assigned to the data. Also, lower LSBs as much as the length of a PDCP serial number in the COUNT value of the TX_NEXT variable are configured with the PDCP serial number.

Also, the COUNT value of the TX_NEXT variable is increased by 1, and the data processed above is concatenated with the PDCP header and delivered to the lower layer.

Another embodiment of the disclosure is that the operation of generating and transmitting feedback at the receiving PDCP layer device receiving the complete header transmitted by the transmitting PDCP layer device, or the timing and method for applying the header compression procedure at the transmitting PDCP layer device is performed differently depending on the mode of the RLC layer device to which the transmitting and receiving PDCP layer devices are connected. For example, because there is no data loss in the case of the transmitting and receiving PDCP layer devices connected to the RLC layer device operating in the RLC AM mode, the transmitting PDCP layer device may transmit one complete header, and the receiving PDCP layer device may construct a corresponding feedback upon receiving the one complete header and transmit the feedback to the transmitting PDCP layer device.

Upon receiving the feedback for the first time, the transmitting PDCP layer device may apply the header compression procedure to subsequent data and transmit them. In still another embodiment, because data loss may occur in the case of the transmitting and receiving PDCP layer devices connected to the RLC layer device operating in the RLC UM mode, the transmitting PDCP layer device may transmit a plurality of complete headers, and the receiving PDCP layer device may construct a corresponding feedback whenever receiving the plurality of complete headers and transmit the feedback to the transmitting PDCP layer device. Upon receiving the feedback for the first time, the transmitting PDCP layer device may apply the header compression procedure to subsequent data and transmit them.

In yet another embodiment, because data loss may occur in the case of the transmitting and receiving PDCP layer devices connected to the RLC layer device operating in the RLC UM mode, the transmitting PDCP layer device may continuously transmit a complete header until receiving a feedback (feedback that the complete header has been successfully received) from the receiving PDCP layer device, and the receiving PDCP layer device may construct a corresponding feedback whenever receiving the complete header and transmit the feedback to the transmitting PDCP layer device. Upon receiving the feedback for the first time, the transmitting PDCP layer device may stop transmitting the complete header, apply the header compression procedure to subsequent data, and transmit them. In further another embodiment, in the case of the transmitting and receiving PDCP layer devices connected to the RLC layer device operating in the RLC AM mode, the transmitting PDCP layer device may continuously transmit a complete header until receiving a feedback (feedback that the complete header has been successfully received) from the receiving PDCP layer device, and the receiving PDCP layer device may construct a corresponding feedback whenever receiving the complete header and transmit the feedback to the transmitting PDCP layer device.

Upon receiving the feedback for the first time, the transmitting PDCP layer device may stop transmitting the complete header, apply the header compression procedure to subsequent data, and transmit them. In further another embodiment, because there is no data loss in the case of the transmitting and receiving PDCP layer devices connected to the RLC layer device operating in the RLC AM mode, the transmitting PDCP layer device may construct and transmit one complete header, process data by applying the header compression procedure from immediately following data, and perform transmission. That is, the data compression procedure may be applied immediately without reception of a feedback (feedback that the complete header has been successfully received) from the receiving PDCP layer device.

In the above, the receiving PDCP layer device may sort the received data in ascending order of the PDCP serial number or COUNT value, receive and process the complete header first because there is no data loss in the RLC AM, check the identifier value of the data flow and the header compression method, perform data processing by applying the header decompression procedure to the following data in ascending order, and deliver the data to the upper layer device. In further another embodiment, because data loss may occur in the case of the transmitting and receiving PDCP layer devices connected to the RLC layer device operating in the RLC UM mode, the transmitting PDCP layer device may transmit a plurality of complete headers, process data by applying the header compression procedure from immediately following data, and perform transmission.

That is, the data compression procedure may be applied immediately without reception of a feedback (feedback that the complete header has been successfully received) from the receiving PDCP layer device. In the above, the receiving PDCP layer device may sort the received data in ascending order of the PDCP serial number or COUNT value, receive and process the complete header first on the assumption that the receiving PDCP layer can receive at least one complete header among the plurality of complete headers with a high probability even if data loss occurs in the RLC UM, check the identifier value of the data flow and the header compression method, perform data processing by applying the header decompression procedure to the following data in ascending order, and deliver the data to the upper layer device.

In addition, the receiving PDCP layer device connected to the RLC layer device operating in the RLC UM or AM may be configured with a new timer value through the RRC message, transmit a feedback upon receiving a complete header, and start the timer. Until the timer expires, the receiving PDCP layer device may not additionally transmit the feedback even if the complete header is received, thus preventing unnecessary feedback generation. In addition, the transmitting PDCP layer device connected to the RLC layer device operating in the RLC UM or AM may consider, upon receiving the feedback for the first time, that the receiving PDCP layer device has successfully received the complete header, and apply the header compression procedure to subsequent data for transmission. For a certain period of time (e.g., until a timer expires in the case where a new timer value is set with the RRC message and the new timer starts upon first reception of feedback), additionally received feedback may be ignored.

The operation of the receiving PDCP layer device in the UE or the base station, provided in the disclosure, is as follows.

The receiving PDCP layer device uses a PDCP serial number length (e.g., 12 bits or 18 bits) configured by the base station via RRC, checks a PDCP serial number of received data (e.g., PDCP PDU), and drives a reception window. In the above, the reception window is configured as the size (e.g., $2^{(PDCP\ SN\ length-1)}$) of half of a PDCP serial number space, and is used to distinguish valid data. That is, data received outside the reception window is determined as invalid data and discarded. The reason why data arrives outside the reception window is that data arrives very late due to retransmission of the RLC layer device or HARQ retransmission of the MAC layer device in the lower layer device. In addition, the receiving PDCP layer device triggers a PDCP reordering timer (t-Reordering) together with the reception window.

In the above, the PDCP reordering timer is triggered when a PDCP serial number gap occurs based on the PDCP serial number in the receiving PDCP layer device, and if data corresponding to the PDCP serial number gap does not arrive until the PDCP reordering timer expires, data are transferred to the upper layer device in ascending order of the PDCP serial number or COUNT value, and the reception window is moved. Therefore, if data corresponding to the PDCP serial number gap arrives after the PDCP reordering timer expires, the the PDCP serial number gap is discarded because the the PDCP serial number gap is not data within the reception window.

A detailed procedure of the receiving PDCP layer device briefly described above is as follows.

The operation of the receiving PDCP layer device in the UE or the base station, provided in the disclosure, is as follows.

The receiving PDCP layer device maintains and manages three COUNT variables when processing the received data. When processing the received data, the receiving PDCP layer device uses a second COUNT variable that maintains a COUNT value of data (e.g., PDCP SDU) expected to be received next, and the second COUNT variable may be named RX_NEXT. Also, when processes the received data, the receiving PDCP layer device uses a third COUNT variable that maintains a COUNT value of the first data (e.g., PDCP SDU) not delivered to the upper layer, and the third COUNT variable may be named RX_DELIV. In addition, when processing the received data, the receiving PDCP layer device uses a fourth COUNT variable that maintains a COUNT value of data (e.g., PDCP SDU) that caused a PDCP reordering timer (t-Reordering) to be triggered, and the fourth COUNT variable may be named RX_REORD.

In addition, when processing the received data, the receiving PDCP layer device uses a fifth COUNT variable that maintains a COUNT value of the currently received data (e.g., PDCP SDU), and the fifth COUNT variable may be named RCVD_COUNT. In the above, the PDCP reordering timer uses a timer value or interval configured in the RRC message as shown in FIG. 5 in the upper layer (RRC layer), the timer is used to detect a lost PDCP PDU, and only one timer is running at a time.

In addition, in the operation of the receiving PDCP layer device, the UE may define and use the following variables:
  HFN: A hyper frame number (HFN) part of the window state variable;
  SN: A sequence number (SN) part of the window state variable;
  RCVD_SN: A PDCP serial number contained in the header of the received PDCP PDU; and/or
  RCVD_HFN: An HFN value of the received PDCP PDU calculated by the receiving PDCP layer device.

The operation of the receiving PDCP layer device in the UE or the base station, provided in the disclosure, is as follows.

Upon receiving a PDCP PDU from a lower layer, the receiving PDCP layer device determines the COUNT value of the received PDCP PDU as follows:
  If the received RCVD_SN is RCVD_SN<=SN(RX_DELIV)−Window_Size,
    update RCVD_HFN to HFN(RX_DELIV)+1.
  Otherwise, if RCVD_SN is RCVD_SN>SN(RX_DELIV)+Window_Size,
    update RCVD_HFN to HFN(RX_DELIV)−1.
  Except in the above cases
    update RCVD_HFN to HFN(RX_DELIV).
  RCVD_COUNT is determined as RCVD_COUNT=[RCVD_HFN, RCVD_SN].

After determining the COUNT value of the received PDCP PDU, the receiving PDCP layer device updates the window state variables and processes the PDCP PDU as follows.
  Deciphering is performed on the PDCP PDU by using the RCVD_COUNT value, and integrity verification is performed:
    If integrity verification fails; and
    indicate integrity verification failure to the upper layer and discard the received PDCP Data PDU (data part of PDCP PDU).
  If RCVD_COUNT<RX_DELIV or if a PDCP PDU with a value of RCVD_COUNT has been received before (in the case of an expired, out-of-date, or out-of-window packet or a duplicate packet),
    discard the received PDCP Data PDU (data part of the PDCP PDU).

If the PDCP PDU received above is not discarded, the receiving PDCP layer device operates as follows:
  The PDCP SDU processed above is stored in a receive buffer; and/or
  If RCVD_COUNT>=RX_NEXT,
    update RX_NEXT to RCVD_COUNT+1.
  If an out-of-order delivery indicator (outOfOrderDelivery) is configured (out-of-order delivery operation is indicated),
    deliver the PDCP SDU to the upper layer.
  If RCVD_COUNT is equal to RX_DELIV,
    if the header decompression procedure has not been applied previously (although the Ethernet header compression protocol or ROHC has been configured) (i.e., data processing has not yet been performed for the upper layer header), and
      if the Ethernet header compression protocol is configured and the Ethernet header is compressed (if an indicator of a new EHC header is checked and compression of the Ethernet header is indicated),
        perform the decompression on the Ethernet header of the data.
      Otherwise, if the Ethernet header compression protocol is configured and the Ethernet header is not compressed (if an indicator of a new EHC header is checked and no compression of the Ethernet header is indicated),
        do not perform the decompression by regarding the Ethernet header of the data as an uncompressed header,
        trigger a feedback to indicate successful reception of the uncompressed Ethernet header to the transmitting PDC layer device, construct the feedback, and transmit the the uncompressed Ethernet header to the transmitting PDCP layer device.
      Otherwise, if the Ethernet header compression protocol is not configured and the ROHC is configured,
        perform the decompression on the upper layer header (TCP/IP or UDP header, etc.) of the data.
    Deliver the above data to the upper layer in the order of COUNT values:
      Starting from the value of COUNT=RX_DELIV, deliver all consecutive PDCP SDUs to the upper layer.
    Update the RX_DELIV value to the COUNT value of the first PDCP SDU that is greater than or equal to the current RX_DELIV but has not been delivered to the upper layer.

If the t-Reordering timer is running and the RX_DELIV value is greater than or equal to RX_REORD,
  stop and reset the t-Reordering timer.
If the t-Reordering timer is not running (including the case where the timer is stopped in the above condition) and RX_DELIV is less than RX_NEXT,
  update RX_REORD value to RX_NEXT, and
  Start the t-Reordering timer.

When the PDCP reordering timer (t-Reordering) expires, the receiving PDCP layer device operates as follows.
If the header decompression procedure has not been applied previously (although the Ethernet header compression protocol or ROHC has been configured) (i.e., data processing has not yet been performed for the upper layer header), and
  if the Ethernet header compression protocol is configured and the Ethernet header is compressed (if an indicator of a new EHC header is checked and compression of the Ethernet header is indicated):
    perform the decompression on the Ethernet header of the data,
  Otherwise, if the Ethernet header compression protocol is configured and the Ethernet header is not compressed (if an indicator of a new EHC header is checked and no compression of the Ethernet header is indicated),
    do not perform the decompression by regarding the Ethernet header of the data as an uncompressed header,
    trigger a feedback to indicate successful reception of the uncompressed Ethernet header to the transmitting PDC layer device, construct the feedback, and transmit the the uncompressed Ethernet header to the transmitting PDCP layer device,
  Otherwise, if the Ethernet header compression protocol is not configured and the ROHC is configured,
    perform the decompression on the upper layer header (TCP/IP or UDP header, etc.) of the data.
Deliver the above data to the upper layer in the order of COUNT values.
  Deliver all PDCP SDUs with COUNT values smaller than the RX_REORD value are delivered, and
  Deliver all PDCP SDUs with consecutive COUNT values starting from the RX_REORD value.
Update the RX_DELIV value to the COUNT value of the first PDCP SDU that has a COUNT value greater than or equal to RX_REORD and has not been delivered to the upper layer.
If the value of RX_DELIV is less than the value of RX_NEXT:
  update the RX_REORD value to the RX_NEXT value, and
  Start the t-Reordering timer.

In the disclosure, a procedure of the transmitting PDCP layer device for each bearer regarding the Ethernet header protocol when a PDCP reestablishment procedure is triggered is provided as follows.
  If it is not instructed to continuously use the Ethernet header compression protocol, the Ethernet header compression protocol is initialized for UM data radio bearer (DRB) or AM DRBs.
  For the AM DRBs, the Ethernet header compression procedure is newly performed on data to be transmitted and retransmitted, the Ethernet header is newly compressed, and the ROHC header compression is also newly performed to process the data and perform transmission and retransmission.
  For the UM DRBs, the Ethernet header compression procedure is newly performed on data that has not yet been transmitted, the Ethernet header is newly compressed, and the ROHC header compression is also newly performed to process the data and perform transmission.

Figure 8:
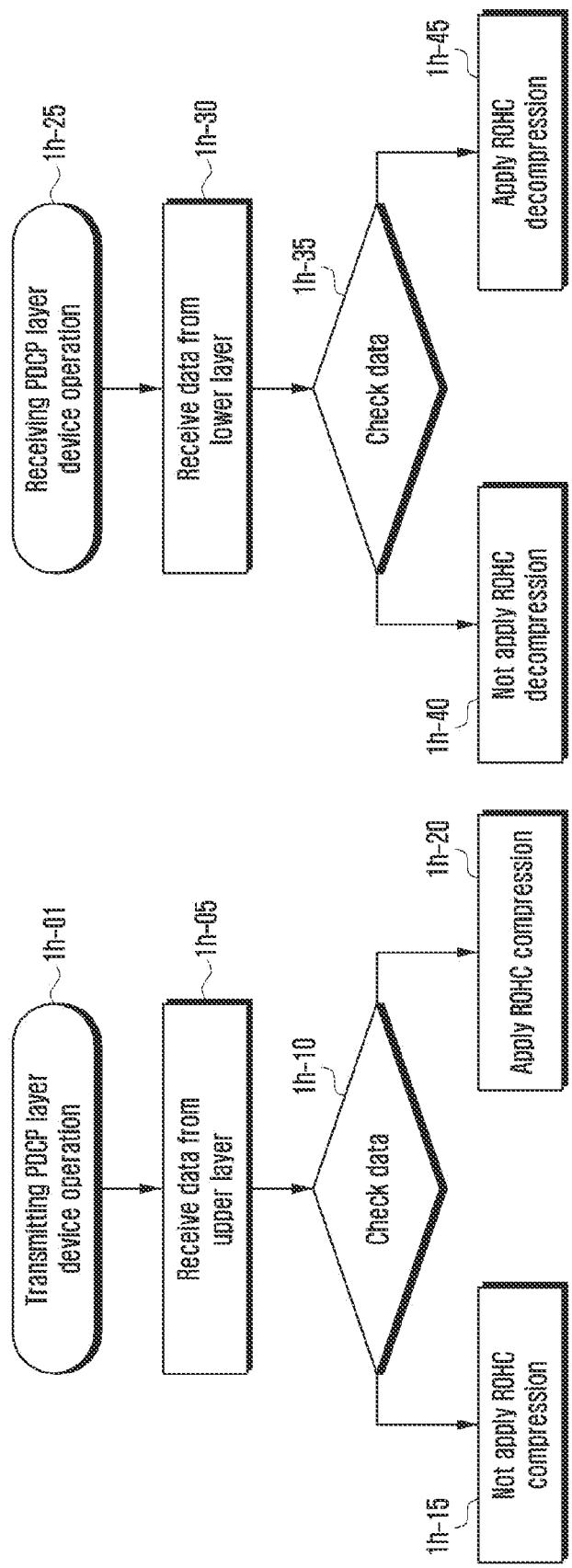
FIG. 8 illustrates an operation of a PDCP layer device when an Ethernet protocol is used on the PDCP layer device or when an EHC header compression method or an ROHC header compression method are configured together according to embodiments of the present disclosure.

FIG. 8 illustrates an operation of a PDCP layer device when an Ethernet protocol is used on the PDCP layer device or when an EHC header compression method and an ROHC header compression method are configured together according to embodiments of the present disclosure.

In FIG. 8, when receiving data from an upper layer device at 1h-05, a transmitting PDCP layer device 1h-01 may perform a procedure for checking the data at 1h-10.

If data (e.g., PDCP SDU) including a non-IP Ethernet packet, data (e.g., PDCP SDU) including an unknown packet (or a packet of unidentifiable type, or an unidentifiable packet whether it is the IP Ethernet packet or the non-IP Ethernet packet), data (e.g., PDCP SDU) including an Ethernet packet that contains a length field in an Ethernet header, or data (e.g., PDCP SDU) including an Ethernet packet that does not contain a type field in the Ethernet header is received from the upper layer device at 1h-10, the EHC compression method (or EHC compressor) may bypass (or may not apply) the ROHC compression method (or ROHC compressor), and the data (EHC compressed non-IP Ethernet packet or EHC compressed packet) to which the EHC compression method is applied may be delivered to a lower layer device at 1h-15.

If data (e.g., PDCP SDU) including the IP Ethernet packet is received from the upper layer device at 1h-10, the EHC compression method (or EHC compressor) may be sent to (or may apply) the ROHC compression method (or ROHC compressor), and the data (EHC or ROHC compressed IP Ethernet packet or EHC or ROHC compressed packet) to which the EHC compression method or the ROHC compression method is applied may be delivered to the lower layer device at 1h-20.

In FIG. 8, when receiving data from the lower layer device at 1h-30, a receiving PDCP layer device 1h-25 may perform a procedure for checking the data at 1h-35.

If data (e.g., PDCP data PDU) including a non-IP Ethernet packet, data (e.g., PDCP data PDU) including an unknown packet (or a packet of unidentifiable type, or an unidentifiable packet whether it is the IP Ethernet packet or the non-IP Ethernet packet), data (e.g., PDCP SDU) including an Ethernet packet that contains the length field in the Ethernet header, or data (e.g., PDCP SDU) including an Ethernet packet that does not contain the type field in the Ethernet header is received from the lower layer device at 1h-35, the EHC decompression method (or EHC decompressor) may bypass (or may not apply) the ROHC decompression method (or ROHC decompressor), and the data (EHC decompressed non-IP Ethernet packet or EHC decompressed packet) to which the EHC decompression method is applied may be delivered to the upper layer device at 1h-40.

If data (e.g., PDCP data PDU) including the IP Ethernet packet is received from the lower layer device at 1h-35, the EHC decompression method (or EHC decompressor) may be sent to (or may apply) the ROHC decompression method (or ROHC decompressor), and the data (EHC or ROHC decompressed IP Ethernet packet or EHC or ROHC decompressed packet) to which the EHC decompression method or the ROHC decompression method is applied may be delivered to the upper layer device at 1h-45.

Figure 9:
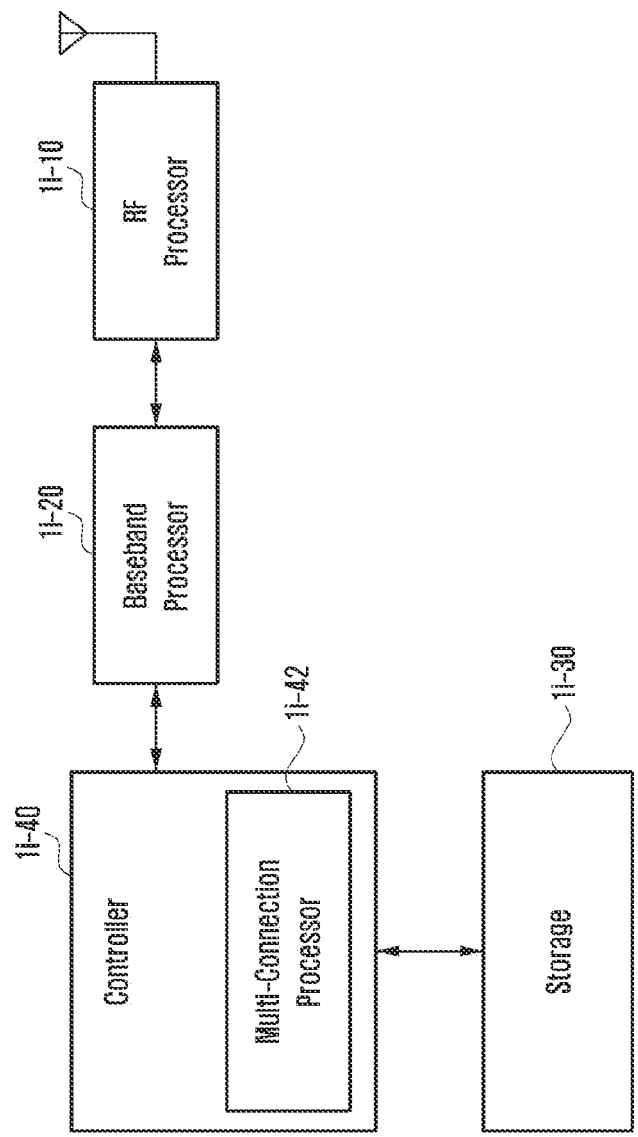
FIG. 9 illustrates a structure of a UE according to embodiments of the present disclosure.

FIG. 9 illustrates a structure of a UE according to embodiments of the present disclosure.

With reference to FIG. 9, the UE may include a radio frequency (RF) processor 1*i*-10, a baseband processor 1*i*-20, a storage 1*i*-30, and a controller 1*i*-40.

The RF processor 1*i*-10 performs a function of transmitting and receiving a signal via a wireless channel, such as band conversion and amplification of a signal. That is, the RF processor 1*i*-10 up-converts a baseband signal provided from the baseband processor 1*i*-20 into an RF band signal, transmits the RF band signal via an antenna, and down-converts an RF band signal received via the antenna into a baseband signal. For example, the RF processor 1*i*-10 may include a transmission filter, a reception filter, an amplifier, a mixer, an oscillator, a digital-to-analog convertor (DAC), an analog-to-digital convertor (ADC), and the like.

Although only a single antenna is illustrated in the drawing, the terminal may include a plurality of antennas. In addition, the RF processor 1*i*-10 may include a plurality of RF chains. Moreover, the RF processor 1*i*-10 may perform beamforming. For the beamforming, the RF processor 1*i*-10 may control a phase and a size of each signal transmitted or received via a plurality of antennas or antenna elements. In addition, the RF processor may perform MIMO, and may receive a plurality of layers while performing the MIMO operation. The RF processor 1*i*-10 may appropriately configure a plurality of antennas or antenna elements according to the control of the controller, so as to perform reception beam sweeping, or may control the orientation of a reception beam and a beam width so that a reception beam accords with a transmission beam.

The baseband processor 1*i*-20 performs a function for a conversion between a baseband signal and a bit stream according to the physical layer standard of a system. For example, in the case of data transmission, the baseband processor 1*i*-20 generates complex symbols by encoding and modulating a transmission bit stream. Further, in the case of data reception, the baseband processor 1*i*-20 reconstructs a reception bit stream by demodulating and decoding a baseband signal provided from the RF processor 1*i*-10. For example, in the case of data transmission, according to an OFDM (orthogonal frequency division multiplexing) scheme, the baseband processor 1*i*-20 generates complex symbols by encoding and modulating a transmission bit stream, mapping the complex symbols to subcarriers, and then configures OFDM symbols via an inverse fast Fourier transform (IFFT) operation and cyclic prefix (CP) insertion. Further, in the case of data reception, the baseband processor 1*i*-20 divides a baseband signal provided from the RF processor 1*i*-10 in the unit of OFDM symbols, reconstructs signals mapped to the subcarriers via a fast Fourier transform (FFT) operation, and then reconstructs a reception bit stream via demodulation and decoding.

The baseband processor 1*i*-20 and the RF processor 1*i*-10 transmit or receive a signal, as described above. Accordingly, the baseband processor 1*i*-20 and the RF processor 1*i*-10 may be referred to as a transmitter, a receiver, a transceiver, or a communication unit. In addition, at least one of the baseband processor 1*i*-20 and the RF processor 1*i*-10 may include a plurality of communication modules so as to support many different radio access technologies. In addition, at least one of the baseband processor 1*i*-20 and the RF processor 1*i*-10 may include different communication modules to process signals of different frequency bands. For example, the different radio access technologies may include an LTE network, an NR network, and the like. Further, the different frequency bands may include a super high frequency (SHF) (e.g., 2.5 GHz and 5 GHz) band and a millimeter (mm) wave (e.g., 60 GHz) band.

The storage 1*i*-30 stores data, such as a basic program, an application program, and configuration information for the operation of the terminal. The storage 1*i*-30 may provide stored data in response to a request from the controller 1*i*-40.

The controller 1*i*-40 may include a multi-connection processor 1*i*-42 and may control the overall operation of the terminal. For example, the controller 1*i*-40 transmits or receives a signal via the baseband processor 1*i*-20 and the RF processor 1*i*-10. In addition, the controller 1*i*-40 writes and reads data to/from the storage 1*i*-40. To this end, the controller 1*i*-40 may include at least one processor. For example, the controller 1*i*-40 may include a communication processor (CP) that performs control for communication, and an application processor (AP) that controls an upper layer, such as an application program.

Figure 10:
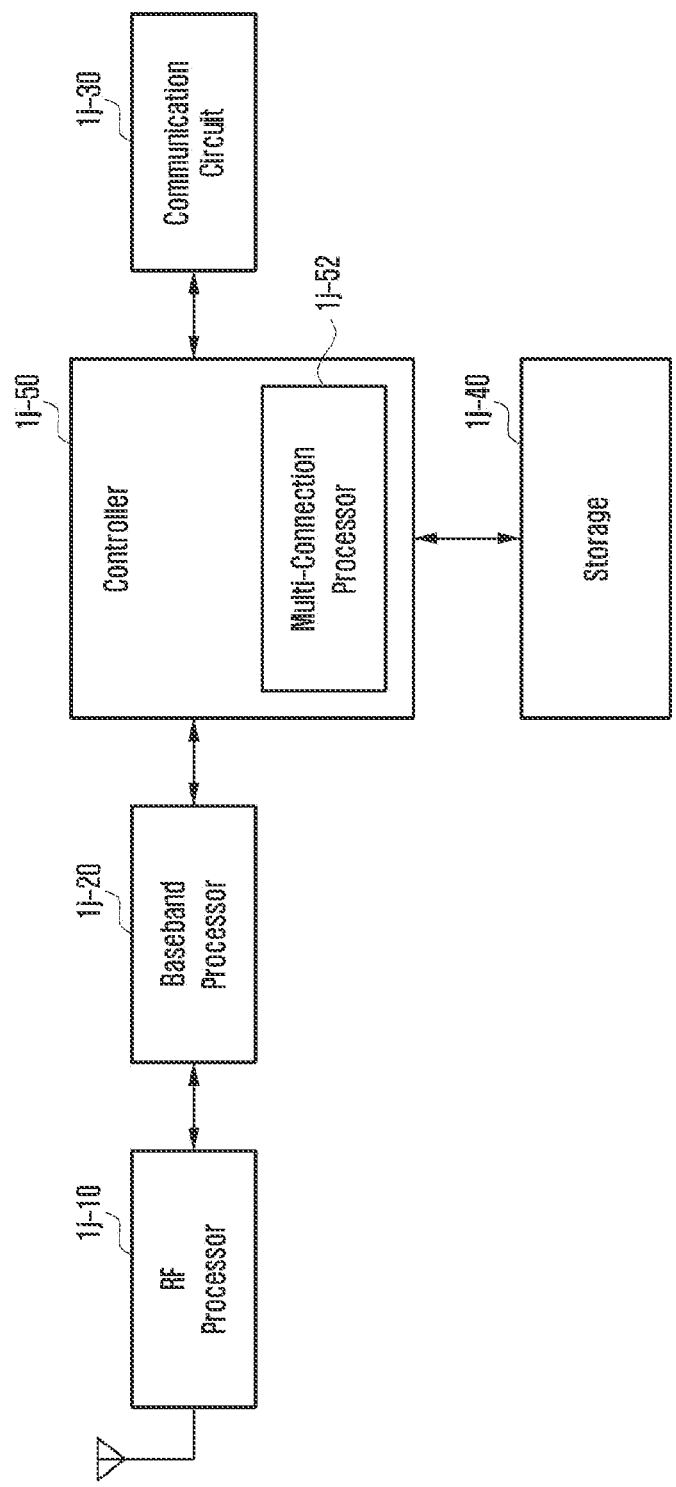
FIG. 10 illustrates a structure of a TRP in a wireless communication system according to embodiments of the present disclosure.

FIG. 10 illustrates a structure of a TRP in a wireless communication system according to embodiments of of the present disclosure.

With reference g to FIG. 10, the TRP (or base station) may include an RF processor 1*j*-10, a baseband processor 1*j*-20, a backhaul communication unit 1*j*-30, a storage 1*j*-40, and a controller 1*j*-50.

The RF processor 1*j*-10 performs a function for transmitting or receiving a signal via a wireless channel, such as band conversion and amplification of a signal. For example, the RF processor 1*j*-10 up-converts a baseband signal provided from the baseband processor 1*j*-20 into an RF band signal and then transmits the converted signal via an antenna, and down-converts an RF band signal received via the antenna into a baseband signal. For example, the RF processor 1*j*-10 may include a transmission filter, a reception filter, an amplifier, a mixer, an oscillator, a DAC, and an ADC. Although only a single antenna is illustrated in the drawing, a first access node may include a plurality of antennas. In addition, the RF processor 1*j*-10 may include a plurality of RF chains. Moreover, the RF processor 1*j*-10 may perform beamforming. For the beamforming, the RF processor 1*j*-10 may control a phase and a size of each of the signals transmitted or received via a plurality of antennas or antenna elements. The RF processor may perform a downlink MIMO operation by transmitting one or more layers.

The baseband processor 1*j*-20 performs a function of converting between a baseband signal and a bit stream according to the physical layer standard of a first radio access technology. For example, in the case of data transmission, the baseband processor 1*j*-20 generates complex symbols by encoding and modulating a transmission bit stream. Further, in the case of data reception, the baseband processor 1*j*-20 reconstructs a reception bit stream by demodulating and decoding a baseband signal provided from the RF processor 1*j*-10. For example, in the case of data transmission, according to an OFDM scheme, the baseband processor 1*j*-20 may generate complex symbols by encoding and modulating a transmission bit stream, map the complex symbols to subcarriers, and then configure OFDM symbols via an IFFT operation and CP insertion. In addition, in the case of data reception, the baseband processor 1*j*-20 divides a baseband signal provided from the RF processor 1*j*-10 in units of OFDM symbols, reconstructs signals mapped to sub-carriers via an FFT operation, and then reconstructs a reception bit string via demodulation and decoding. The baseband processor 1*j*-20 and the RF processor 1*j*-10 transmit or receive a signal, as described above. Accordingly, the baseband processor 1*j*-20 and the RF processor 1*j*-10 may be referred to as a transmitter, a receiver, a transceiver, a communication unit, or a wireless communication unit.

The communication unit 1j-30 provides an interface for performing communication with other nodes in a network.

The storage 1j-40 may store data, such as, a basic program, an application program, configuration information, or the like, for the operation of main base station. Particularly, the storage 1j-40 may store information associated with a bearer allocated to a connected terminal, a measurement result reported from a connected terminal, and the like. In addition, the storage 1j-40 may store information which is a criterion to determine whether to provide or interrupt multiple-access to a terminal. Also, the storage 1j-40 may provide stored data in response to a request from the controller 1j-50.

The controller 1j-50 may include a multi-connection processor 1j-52 and may control the overall operation of the main base station. For example, the controller 1j-50 transmits or receives a signal via the baseband processor 1j-20 and the RF processor 1j-10, or via the backhaul communication unit 1j-30. In addition, the controller 1j-50 writes and reads data to/from the storage 1j-40. To this end, the controller 1j-50 may include at least one processor.

Although specific embodiments have been described in the detailed description of the disclosure, various modifications are possible without departing from the scope of the disclosure. Therefore, the scope of the disclosure should not be limited to the described embodiments and should be defined by claims set forth below as well as equivalents to claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a transmitting device in a wireless communication system, the method comprising:
receiving, at a packet data convergence protocol (PDCP) layer, a PDCP service data unit (SDU) from an upper layer;
identifying whether an Ethernet header of the PDCP SDU includes a type field indicating that the PDCP SDU is an internet protocol (IP) packet;
in case that the Ethernet header of the PDCP SDU includes the type field, processing the PDCP SDU using an Ethernet header compression (EHC) compressor and a robust header compression (ROHC) compressor;
in case that the Ethernet header of the PDCP SDU does not include the type field, processing the PDCP SDU using the EHC compressor by bypassing the ROHC compressor; and
transmitting, to a receiving device, the processed PDCP SDU through a lower layer.

2. The method of claim 1, wherein identifying whether the Ethernet header of the PDCP SDU includes the type field further comprises:
identifying whether both EHC and ROHC are configured for a data radio bearer (DRB) corresponding to the PDCP layer;
in case that both the EHC and the ROHC are configured for the DRB, determining that the Ethernet header of the PDCP SDU includes the type field; and
in case that one of the EHC or the ROHC is configured for the DRB, determining that the Ethernet header of the PDCP SDU does not include the type field.

3. The method of claim 1, further comprising:
in case that the transmitting device is a base station, identifying whether a format of the Ethernet header is a format including the type field;
in case that the format of the Ethernet header is the format including the type field, configuring both EHC and ROHC for a data radio bearer (DRB) corresponding to the PDCP layer; and
transmitting, to the receiving device, PDCP configuration information including an EHC configuration and an ROHC configuration.

4. The method of claim 1, further comprising:
determining that the Ethernet header of the PDCP SDU does not include the type field, in case that the Ethernet header of the PDCP SDU includes a length field.

5. The method of claim 1, further comprising:
in case that the Ethernet header of the PDCP SDU includes the type field, processing the PDCP SDU using the EHC compressor.

6. A method performed by a receiving device in a wireless communication system, the method comprising:
receiving, at a packet data convergence protocol (PDCP) layer, a PDCP data protocol data unit (PDU), from a transmitting device, through a lower layer;
identifying whether an Ethernet header of the PDCP data PDU includes a type field indicating that the PDCP data PDU is an internet protocol (IP) packet;
in case that the Ethernet header of the PDCP data PDU includes the type field, processing the PDCP data PDU using an Ethernet header compression (EHC) decompressor and a robust header compression (ROHC) decompressor;
in case that the Ethernet header of the PDCP data PDU does not include the type field, processing the PDCP data PDU using the EHC decompressor by bypassing the ROHC decompressor; and
delivering, to an upper layer, the processed PDCP data PDU.

7. The method of claim 6, wherein identifying whether the Ethernet header of the PDCP data PDU includes the type field further comprises:
identifying whether both EHC and ROHC are configured for a data radio bearer (DRB) corresponding to the PDCP layer;
in case that both the EHC and the ROHC are configured for the DRB, determining that the Ethernet header of the PDCP data PDU includes the type field; and
in case that one of the EHC or the ROHC is configured for the DRB, determining that the Ethernet header of the PDCP data PDU does not include the type field.

8. The method of claim 6, further comprising:
receiving, from a base station, PDCP configuration information including both an EHC configuration and an ROHC configuration for a data radio bearer (DRB) that corresponds to the PDCP layer,
wherein the transmitting device is the base station, and
wherein a format of the Ethernet header includes the type field.

9. The method of claim 6, further comprising:
determining that the Ethernet header of the PDCP data PDU does not include the type field, in case that the Ethernet header of the PDCP data PDU includes a length field.

10. The method of claim 6, further comprising:
in case that the Ethernet header of the PDCP data PDU includes the type field, processing the PDCP data PDU using the EHC decompressor.

11. A transmitting device in a wireless communication system, the transmitting device comprising:
a transceiver; and
a controller operably connected to the transceiver, the controller configured to:
receive, at a packet data convergence protocol (PDCP) layer, a PDCP service data unit (SDU) from an upper layer,
identify whether an Ethernet header of the PDCP SDU includes a type field indicating that the PDCP SDU is an internet protocol (IP) packet,
in case that the Ethernet header of the PDCP SDU includes the type field, process the PDCP SDU using an Ethernet header compression (EHC) compressor and a robust header compression (ROHC) compressor,
in case that the Ethernet header of the PDCP SDU does not include the type field, process the PDCP SDU using the EHC compressor by bypassing the ROHC compressor, and
control the transceiver to transmit, to a receiving device, the processed PDCP SDU through a lower layer.

12. The transmitting device of claim 11, wherein the controller is further configured to:
identify whether both EHC and ROHC are configured for a data radio bearer (DRB) corresponding to the PDCP layer;
in case that both the EHC and the ROHC are configured for the DRB, determine that the Ethernet header of the PDCP SDU includes the type field; and
in case that one of the EHC or the ROHC is configured for the DRB, determine that the Ethernet header of the PDCP SDU does not include the type field.

13. The transmitting device of claim 11, wherein the controller is further configured to:
in case that the transmitting device is a base station, identify whether a format of the Ethernet header is a format including the type field;
in case that the format of the Ethernet header is the format including the type field, configure both EHC and ROHC for a data radio bearer (DRB) corresponding to the PDCP layer; and
control the transceiver to transmit, to the receiving device, PDCP configuration information including an EHC configuration and an ROHC configuration.

14. The transmitting device of claim 11, wherein the controller is further configured to:
determine that the Ethernet header of the PDCP SDU does not include the type field, in case that the Ethernet header of the PDCP SDU includes a length field.

15. The transmitting device of claim 11, wherein the controller is further configured to:
in case that the Ethernet header of the PDCP SDU includes the type field, process the PDCP SDU using the EHC compressor.

16. A receiving device in a wireless communication system, the receiving device comprising:
a transceiver; and
a controller operably connected to the transceiver, the controller configured to:
control the transceiver to receive, at a packet data convergence protocol (PDCP) layer, a PDCP data protocol data unit (PDU), from a transmitting device, through a lower layer,
identify whether an Ethernet header of the PDCP data PDU includes a type field indicating that the PDCP data PDU is an internet protocol (IP) packet,
in case that the Ethernet header of the PDCP data PDU includes the type field, process the PDCP data PDU using an Ethernet header compression (EHC) decompressor and a robust header compression (ROHC) decompressor,
in case that the Ethernet header of the PDCP data PDU does not include the type field, process the PDCP data PDU using the EHC decompressor by bypassing the ROHC decompressor, and
deliver, to an upper layer, the processed PDCP data PDU.

17. The receiving device of claim 16, wherein the controller is further configured to:
identify whether both EHC and ROHC are configured for a data radio bearer (DRB) corresponding to the PDCP layer;
in case that both the EHC and the ROHC are configured for the DRB, determine that the Ethernet header of the PDCP data PDU includes the type field; and
in case that one of the EHC or the ROHC is configured for the DRB, determine that the Ethernet header of the PDCP data PDU does not include the type field.

18. The receiving device of claim 16, wherein the controller is further configured to control the transceiver to receive, from a base station, PDCP configuration information including both an EHC configuration and an ROHC configuration for a data radio bearer (DRB) which corresponds to the PDCP layer,
wherein the transmitting device is the base station, and
wherein a format of the Ethernet header includes the type field.

19. The receiving device of claim 16, wherein the controller is further configured to determine that the Ethernet header of the PDCP data PDU does not include the type field, in case that the Ethernet header of the PDCP data PDU includes a length field.

20. The receiving device of claim 16, wherein, in case that the Ethernet header of the PDCP data PDU includes the type field, the controller is further configured to process the PDCP data PDU using the EHC decompressor.

* * * * *